United States Patent [19]
Uehara et al.

[11] Patent Number: 6,050,381
[45] Date of Patent: Apr. 18, 2000

[54] WEAR COMPENSATION MECHANISM FOR CLUTCH MECHANISM

[75] Inventors: Hiroshi Uehara; Norihisa Uenohara, both of Neyagawa, Japan

[73] Assignee: Exedy Corporation, Neyagawa, Japan

[21] Appl. No.: 08/990,810

[22] Filed: Dec. 15, 1997

[30] Foreign Application Priority Data

| Dec. 13, 1996 | [JP] | Japan | 8-334145 |
| Jun. 27, 1997 | [JP] | Japan | 9-171767 |
| Jun. 27, 1997 | [JP] | Japan | 9-171768 |

[51] Int. Cl.$^7$ .................................................. F16D 13/75
[52] U.S. Cl. ................................. 192/70.25; 192/111 A
[58] Field of Search .............................. 192/70.25, 111 A

[56] References Cited

U.S. PATENT DOCUMENTS

| 4,207,972 | 6/1980 | Zeidler . | |
| 5,409,091 | 4/1995 | Reik et al. . | |
| 5,450,934 | 9/1995 | Maucher . | |
| 5,513,735 | 5/1996 | Uenohara . | |
| 5,513,736 | 5/1996 | Mizukami | 192/111 A |
| 5,568,852 | 10/1996 | Tomiyama | 192/70.25 |
| 5,570,768 | 11/1996 | Uenohara et al. | 192/70.25 |
| 5,634,541 | 6/1997 | Maucher | 192/70.25 |

*Primary Examiner*—Rodney H. Bonck
*Attorney, Agent, or Firm*—Shinjyu An Intellectual Property Firm

[57] ABSTRACT

In a clutch cover assembly, a regulating mechanism allows a fulcrum ring to move in an axial direction away from a pressure plate in response to wear of a friction facing, but limits amount of movement in accordance with the amount of wear. The regulating mechanism includes a bolt and a bushing. The bolt is fixed to a second side face of the pressure plate and extends axially. The bushing is engaged with the bolt by the friction force. In an alternate embodiment, an urging mechanism of the clutch cover assembly urges a fulcrum ring away from the pressure plate. The fulcrum ring is formed with a plurality of first inclined faces which engage second inclined faces formed on a wedge part. A friction plate is disposed between the pressure plate and the wedge part limiting movement of the wedge part.

13 Claims, 16 Drawing Sheets

O ———·——— O

WEAR COMPENSATION MECHANISM FOR CLUTCH MECHANISM

BACKGROUND OF THE INVENTION

1. Field of the Invention

The present invention relates to a clutch cover assembly for a dual clutch disc clutch mechanism and particularly to a clutch cover assembly which has a wear compensation mechanism to compensate for wear of the friction facings and to maintain a generally constant biasing pressure from a diaphragm spring and corresponding pressure plate on the clutch discs throughout the useful life of the mechanism regardless of the wear of the friction facings on the clutch discs. The present invention further relates to a clutch cover assembly which has an abrasion mechanism to assist in maintaining the generally constant biasing pressure from a diaphragm spring and corresponding pressure plate on the clutch discs throughout the useful life of the mechanism regardless of the wear of the friction facings on the clutch discs

2. Description of the Related Art

A clutch cover assembly of a clutch device is installed to a flywheel of the engine. Friction facings of the clutch disk assembly are selectively pressed against the flywheel by spring force of a diaphragm spring. Thus, a torque of the engine is transmitted to the transmission side. When the wear amount of the friction facings is above a specified amount in the clutch device, the friction facings can not be used or the pressing load changes because a posture of the diaphragm spring of the clutch covers changes. As the result, the clutch disk assembly has to be exchanged for a new one. Therefore, there is a demand for a clutch disk with a longer life span.

In order to achieve a long life span of the clutch, it is important to increase the available thickness of the friction facings of the clutch disk assembly. For the purpose, the friction facings are fixed to a cushioning plate without using rivets, etc.

In a clutch cover assembly, when the friction facings is worn, in order to extend the life of the clutch disk, it is necessary to restore a diaphragm spring to the initial position for better contact with the friction facing. For that purpose, the wear amount needs to be determined, and depending on the wear amount, members which support a diaphragm spring (a fulcrum ring of a pressure plate side, or a supporting mechanism of a clutch cover side) are sometimes made to be adjustable. Once adjusted, the life of friction facings of a clutch disk assembly can be extended.

A wear compensation mechanism of the clutch cover assembly includes mainly a fulcrum ring disposed between a clutch cover and a diaphragm spring, an urging mechanism to urge a fulcrum ring away from a pressure plate and a regulating mechanism not only to prevent a fulcrum ring from becoming dis-engaged from a pressure plate but also to permit a fulcrum ring to move away from the pressure plate in an axial direction corresponding to the wear amount of the friction facings as they become worn.

The regulating mechanism is installed inside the pressure plate. An open portion is formed in the pressure plate on the side opposite to the friction facings, a friction bush is installed, and inside the bush a wear sensor member is installed. The wear sensor member, which prevents a fulcrum ring from moving toward the clutch cover side, is connected not only with the friction bush by a friction force but also with the clutch cover so as not to move toward the friction facings side.

When the friction facings is worn, the pressure plate moves so as away from the friction sensor connected with the clutch cover. As the result, a space is formed between the wear sensor member and the fulcrum ring corresponding to the wear amount. Then, when releasing the clutch, the fulcrum ring moves toward the sensor member until touching it by the urging mechanism. As the result, the posture of the diaphragm spring is kept generally the same as wear occurs.

The above described conventional wear compensation mechanism has a friction-connecting member between a wear sensor member and a friction bush inside the pressure plate. Therefore, the friction-connecting member tends to be affected by heat transmitted from the friction face of the pressure plate. As the result, the frictional resistance caused at the friction-connecting member is not stable.

When a vigorous vibration is caused during engaging the clutch, under adjustment sometimes occurs. Under adjustment is a phenomenon that, when the pressing part presses the fulcrum ring in an axial direction in engaging the clutch and the force is applied in an axial direction from the first inclined faces of the wedge mechanism to the second inclined faces, the wedge part slides toward the original position because of the increased force applied in a circular direction to the wedge part with the second inclined faces. Under such a condition the location of the fulcrum ring does not compensate for all of the wear.

One way to prevent the under adjustment is to decrease an inclining angle of the first and second inclined faces. Since the component in a circular direction of the force applied in an axial direction to the wedge part decreases, the wedge part hardly slides to the initial position. However, when the inclining angle decreases, over adjustment tends to happen occur where the wedge moves too much in a circular direction and moves the fulcrum ring in an axial direction more than the wear amount. Therefore, decreasing the inclining angle is not desirable.

SUMMARY OF THE INVENTION

One object of the present invention is to stabilize the friction resistance of the friction-connecting member in the wear compensation mechanism of the clutch cover assembly.

Another objective of the present invention is to control the sliding capability of wedges in an urging mechanism of a clutch cover assembly.

In accordance with one aspect of the present invention, a clutch cover assembly includes a clutch cover fixed to a flywheel. The clutch cover has an annular pressure plate configured for selective engagement with friction facings that is disposed between the pressure plate and the flywheel. The pressure plate is formed with a first side face configured for engagement with the friction facings and a second side face. A fulcrum ring is disposed between the clutch cover and the second side face. A biasing element is supported by the clutch cover between the clutch cover and the pressure plate. The biasing element urges the fulcrum ring toward the pressure plate. An urging mechanism is disposed between the pressure plate and the fulcrum ring, the urging mechanism biasing the fulcrum ring away from the pressure plate. A regulating mechanism is disposed on the clutch cover. The regulating mechanism includes a first member fixed to the second side face. The first member has a portion extending in an axial direction, The regulating mechanism includes a second member connected to the first member by friction force. The second member further includes an abutting portion abutting on the clutch cover from a side thereof opposite the friction facings, said regulating mechanism for restricting movement of the fulcrum ring. The first member extends through the second member. The regulating mechanism is configured such that in response to wear of the friction facings, the regulating mechanism regulates movement of the fulcrum ring in an axial direction corresponding to wear amounts of the friction facings, and second member moves in an axial direction against the first member in response to a predetermined force.

Preferably, the first member is pin-like and the second member includes an elastic tube formed with an axially extending slit. The second member is disposed firmly around an outer circumference of the first member.

Preferably, one end of the second member abuts on a side of the fulcrum ring adjacent to the clutch cover.

Preferably, the clutch cover is formed with a first hole in an axial direction, the fulcrum ring has a hole formed therein corresponding to the first hole. The first member extends through the first hole into the hole in the fulcrum ring. The first member further extends into the second side face of the pressure plate so as to be detachable therefrom, and the second member is set firmly around an outer circumference of the first member in the first hole and has the abutting portion an end thereof which abuts on an outer portion of the clutch cover.

Preferably, the first member has a head portion at a distal end thereof having a larger diameter than that of a portion thereof which extends through the first hole. The head portion is spaced apart from the abutting portion by a predetermined distance.

Preferably, the fulcrum ring has a projecting portion projecting outward in a radial direction from an annular portion thereof, and the hole in the fulcrum ring is formed in the projecting portion.

Preferably, the clutch cover assembly further includes an elastic plate having a first end fixed to the clutch cover and a second end fixed to the fulcrum ring such that the clutch cover and the fulcrum ring are circumferentially fixed to one another but may undergo limited axial displacement with respect to one another.

Preferably, the urging mechanism includes a pair of annular members which are disposed between the pressure plate and the annular portion of the fulcrum ring, each of the annular members being formed with a plurality of inclined faces extending in a circumferential direction abutting each other. A spring member urges the fulcrum ring away from the pressure plate in an axial direction by urging the inclined faces against one another in the circumferential direction.

Preferably, the urging mechanism includes a first annular member which is fixed to the face of the pressure plate side of the fulcrum ring and has a plurality of first inclined faces. A second annular member is disposed on the second side face of the pressure plate so as to be rotatable with respect thereto. The second annular member has a plurality of second inclined faces abutting on the plurality of first inclined faces. An urging member urges the first annular member and the fulcrum ring to move in an axial direction away from the pressure plate by urging the second annular member into rotation with respect to the first annular member and thereby urging the second inclined faces against the first inclined faces.

Preferably, a connecting member extends between the fulcrum ring and the clutch cover and is flexible in an axial direction. The first member is connected with the hole in the fulcrum ring so as to be movable in an axial direction but not to move in a circular direction with respect to the fulcrum ring.

In accordance with another aspect of the present invention, a clutch cover assembly includes a clutch cover fixed to a flywheel. The clutch cover has an annular pressure plate configured for selective engagement with friction facings disposed between the pressure plate and the flywheel. The pressure plate is formed with a first side face configured for engagement with the friction facings and a second side face. A fulcrum ring is disposed between the clutch cover and the second side face. The fulcrum ring is formed with a plurality of first inclined faces on an annular portion thereof extending toward the flywheel. A biasing element is supported by the clutch cover between the clutch cover and the pressure plate. The biasing element biases the fulcrum ring toward the pressure plate and thereby biasing the pressure plate toward the flywheel. An urging mechanism is disposed between the pressure plate and the fulcrum ring. The urging mechanism biases the fulcrum ring away from the pressure plate. The urging mechanism includes a wedge part formed with a plurality of second inclined faces. The fulcrum ring and the wedge part are biased into relative rotation with respect to each other such that upon relative rotation with respect to one another the first and second inclined faces engage with one another urging the fulcrum ring away from the pressure plate. The urging mechanism further includes a friction coefficient adjusting part disposed between the wedge part and the pressure plate. A regulating mechanism is disposed on the clutch cover configured such that in response to wear of the friction facings the regulating mechanism regulates movement of the fulcrum ring in an axial direction corresponding to wear amounts of the friction facing, and circumferentially fixes the fulcrum ring to the clutch cover.

Preferably, the friction coefficient adjusting part has a higher friction coefficient than the pressure plate and the wedge part.

Preferably, the friction coefficient adjusting part is an annular plate.

Preferably, the friction coefficient adjusting part covers at least a portion of one of the pressure plate and the wedge part.

Preferably, an inclining angle of the first inclined face and the second inclined face is set to be between 10 to 15 degrees.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

First Embodiment

Figure 1:
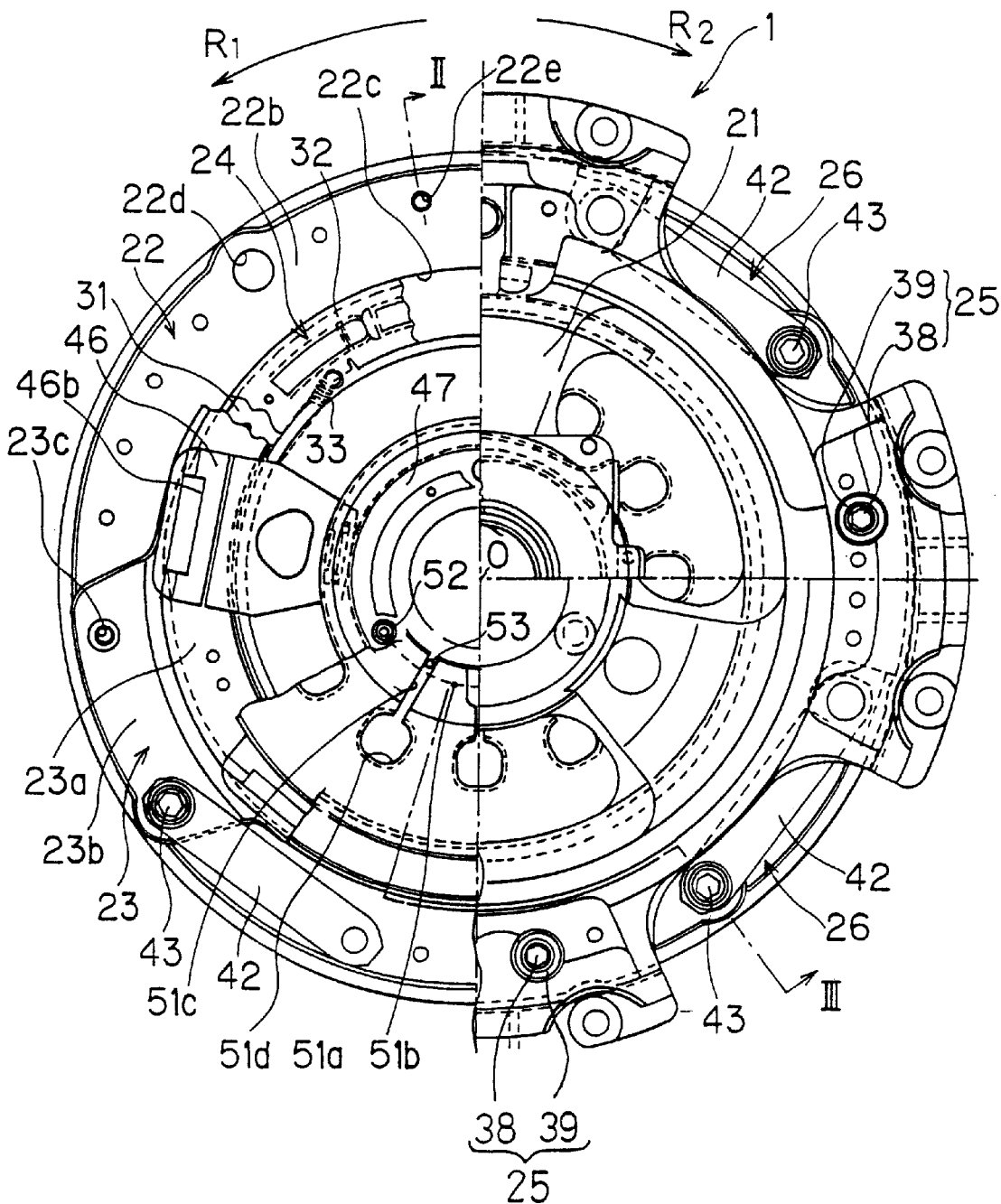
FIG. 1 is a part elevation view, part cutaway view showing a clutch cover assembly of a clutch device in accordance with a first embodiment of the present invention.
Figure 2:
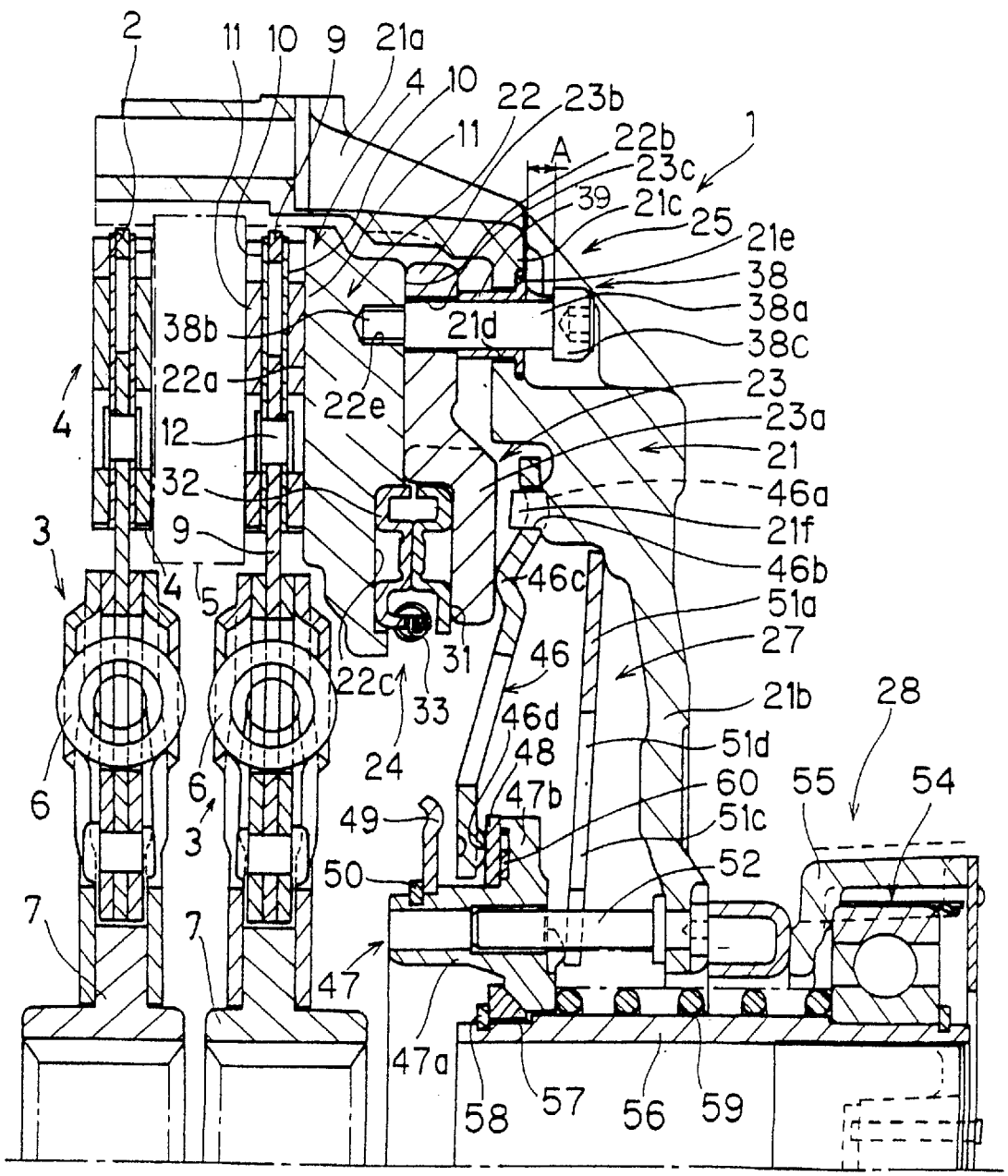
FIG. 2 is a fragmentary, cross-sectional side view of the clutch device depicted in FIG. 1, taken along the line II in FIG. 1.
Figure 3:
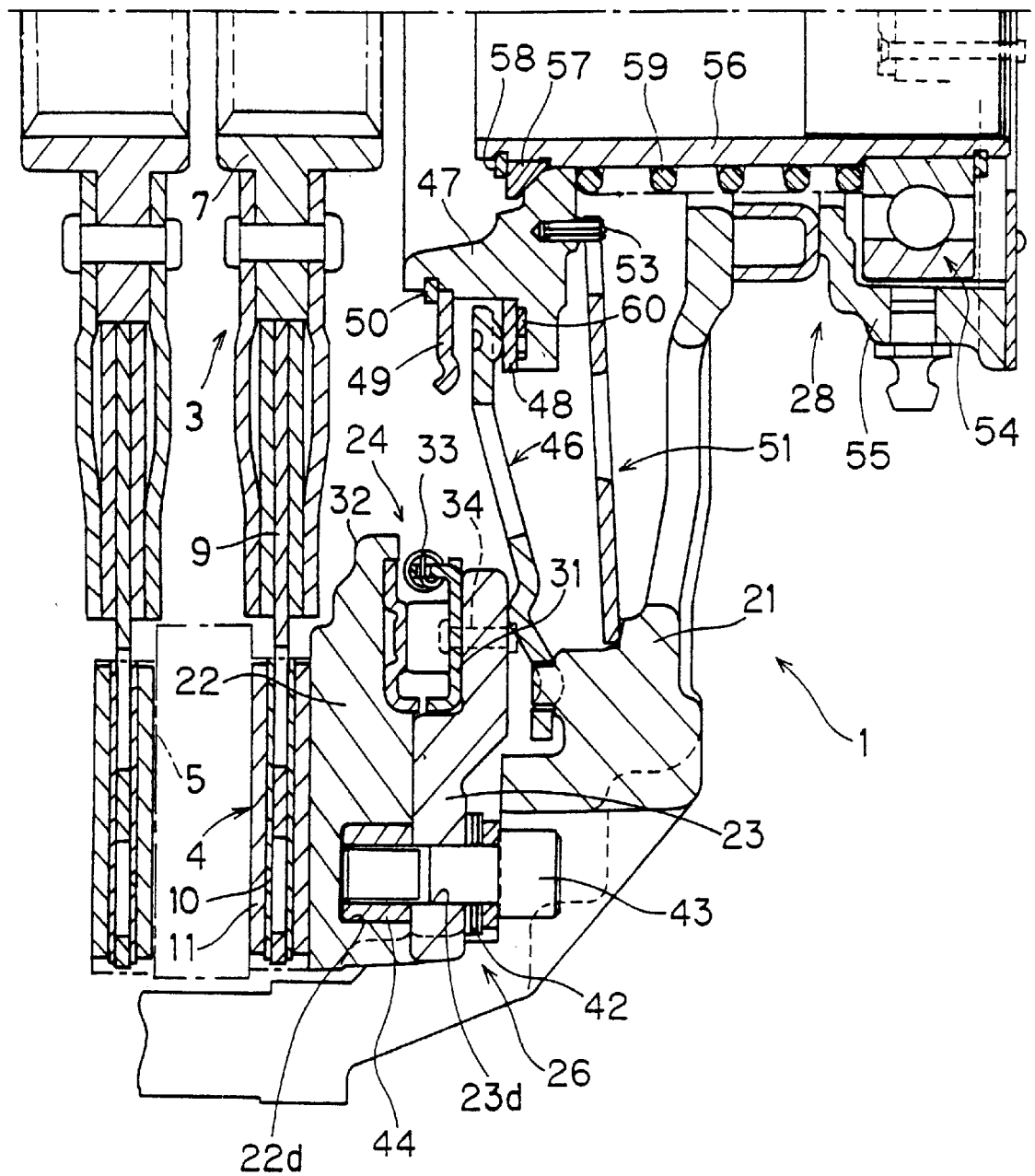
FIG. 3 is a fragmentary, cross-sectional side view of the clutch device depicted in FIG. 1, taken along the line III in FIG. 1.

FIGS. 1, 2 and 3 show a clutch cover assembly 1 in accordance with a first embodiment of the present invention. The clutch cover assembly 1 is used for a vehicle, particularly for a large vehicle such as a truck. The clutch cover assembly 1 is a device to selectively transmit torque from a flywheel 2 of an engine to a clutch disk assembly 3 and is installed on the flywheel 2. The clutch device includes two clutch disk assemblies 3 and an intermediate plate 5 is disposed between friction disks 4 of clutch disk assemblies 3. The clutch cover assembly 1 of the present invention can be applied to a clutch device including one clutch disk assembly.

The clutch disk assembly 3 includes mainly the friction disk 4 and a hub 7 which is connected to the friction disk 4 via a coil spring 6. The friction disk 4 includes a plurality of friction plates 8 fixed to outer circumference of both sides of a disk like plate 9. Each friction plate 8 includes a core plate 10 which is fixed to the disk like plate 9, and the friction facings 11 which is fixed to the core plate 10. In this embodiment, the friction facing 11 is made of sintered ceramic-metal materials.

The clutch rotates in a direction shown by R1 in FIG. 1, and a second support plate 32, described below, rotates in a direction shown by R2 in response to wear of the friction facings 11. In FIGS. 2 and 3, the engine (not shown) is disposed on the left side and the transmission (not shown) is disposed on the right side. Hereinafter, the left side of FIGS. 2 and 3 will be referred to as the engine side and the right side of FIGS. 2 and 3 will be referred to as the transmission side.

The clutch cover assembly 1 includes mainly a clutch cover 21, a pressure plate 22, a fulcrum ring 23, an urging mechanism 24, a regulating mechanism 25, a clutch pressing mechanism 27, a driving mechanism 26, and a releasing device 28.

The clutch cover 21 is a dish like member which is installed on the flywheel 2. The clutch cover 21 includes a covering member 21a which covers an outer circumferential side of the clutch disk assembly 3, and a disk like member 21b which faces the transmission side of the clutch disk assembly 3. An annular facing member 21c which faces the friction disk 4 in an axial direction is formed at the outer circumference of the disk like member 21b. Four first holes 21d in an axial direction are formed at equal intervals at the facing member 21c (outer circumference of disk like member 21b). A hollow 21e which has a larger diameter than that of the first hole 21d in an axial direction is formed at the transmission side of the first hole 21d in an axial direction.

The pressure plate 22 is disposed inside the covering member 21a of the clutch cover 21, adjacent to the friction disk 4 between the friction disk 4 and the facing member 21c of the clutch cover 21. The pressure plate 22 is an annular member, which is made of a cast iron. The pressure plate 22 includes a friction face 22a (a first side face) facing the friction disk 4 and a second side face 22b facing the facing member 21c. A channel 22c is formed extending in a circular direction at the inner circumference of the second side face 22b of the pressure plate 22. The urging mechanism 24 (described in greater detail below) is installed in the channel 22c. Four connecting hollows 22d are formed at equal intervals in a circular direction at the outer circumference of the second side face 22b of the pressure plate 22. A tapped hole 22e is formed in a R2 direction side of each connecting hollow 22d.

The fulcrum ring 23 is disposed at the second side face 22b side of the pressure plate 22. The fulcrum ring 23 moves toward the flywheel 2 side together with the pressure plate 22, receiving a load from a lever member 46. The fulcrum ring 23 includes an annular portion 23a, and three projection portions 23b extending outward in a radial direction. The annular portion 23a is placed facing against the channel 22c of the pressure plate 22 with a specified interval. The projection portion 23b abuts on the second side face 22b of the pressure plate 22. As shown in FIG. 1, the projection portion 23b extends at a specified angle in a circular direction, a second hole in an axial direction 23c is formed in the projection portion 23b at the R2 direction side, and a third hole in an axial direction 23d is formed at the R1 direction side. The second hole 23c and the third hole 23d correspond to the tapped hole 22e and the connecting hollow 22d of the pressure plate 22, respectively. The second hole 23c corresponds to the first hole 21d, and has a smaller diameter than the first hole 21d.

The fulcrum ring 23 and the pressure plate 22 rotate together with the clutch cover 21 and the flywheel 2 by the driving mechanism 26. Four driving mechanisms 26 are circumferentially spaced apart within the clutch cover 21. Each driving mechanism 26 includes a strap plate 42, a bolt 43 and a block 44 (FIG. 3). The strap plate 42 connects the fulcrum ring 23 with the clutch cover 21 so as not to rotate but to be movable in an axial direction. The strap plate 42 is an elastic plate that includes three adjacent plate members extending in a circular direction (roughly tangent direction).

The end in a R1 direction of the strap plate 42 is fixed to a clutch cover 21. The end in a R2 direction of the strap plate is fixed to the fulcrum ring 23 by the bolt 43. The bolt 43 passes through the third hole 23d and its distal end connects to the block 44. The end in a R2 direction of the strap plate 42 is held between the projection portion 23b and the head of the bolt 43. The block 44 is inserted in the connecting hollow 22d of the pressure plate 22. The block 44 is movable against the connecting hollow 22d from the position in FIG. 3 toward the transmission side. The block 44 connects the fulcrum ring 23 with the pressure plate 22 so as not to rotate relatively but to be movable relatively in an axial direction.

Figure 6:
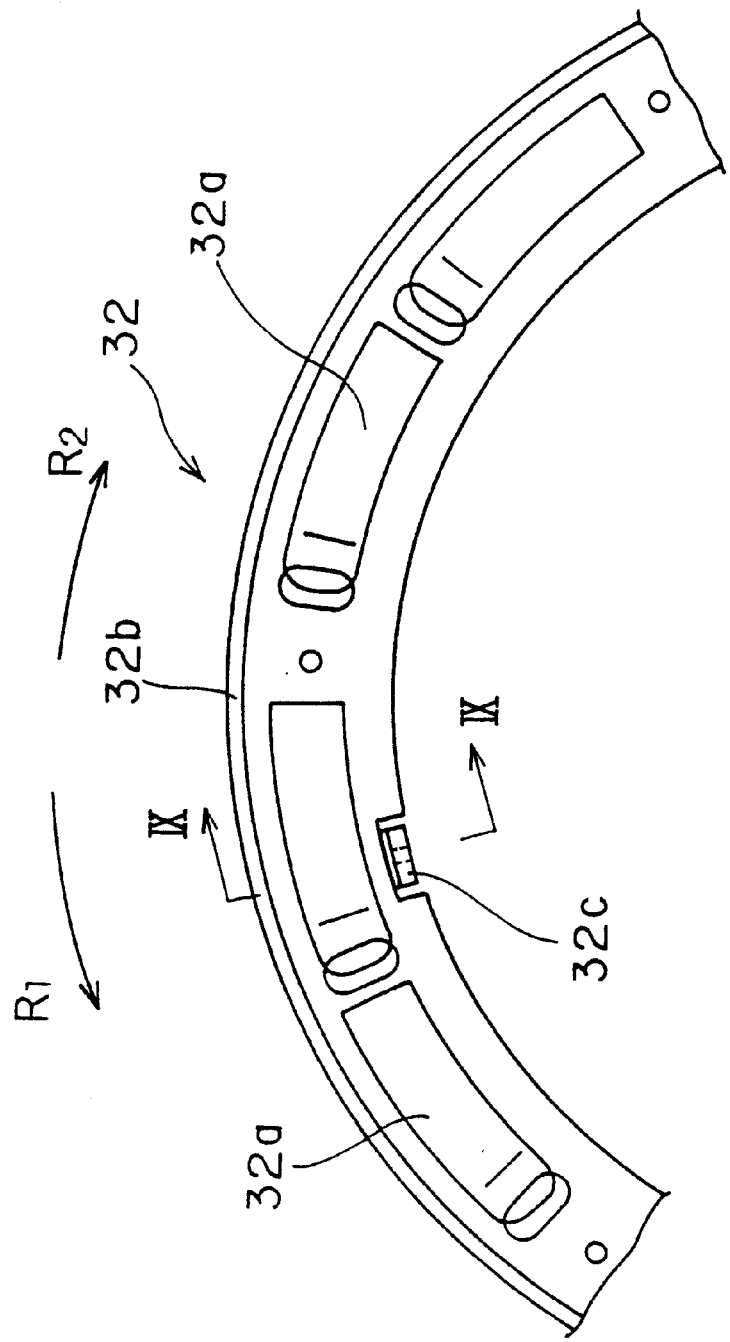
FIG. 6 is a fragmentary, elevation view of a portion of a first support plate of a wear compensation mechanism shown removed from the clutch device depicted in FIGS. 1, 2, 3 and 4.
Figure 7:
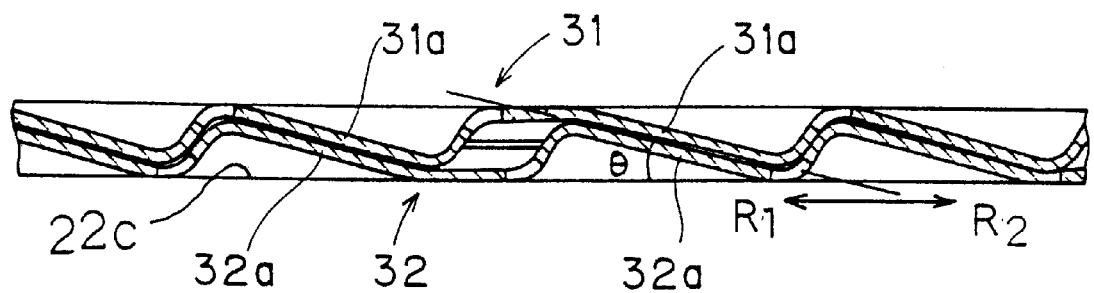
FIG. 7 is a circumferentially extending cross-sectional side view of an urging mechanism of the wear compensation mechanism.
Figure 8:
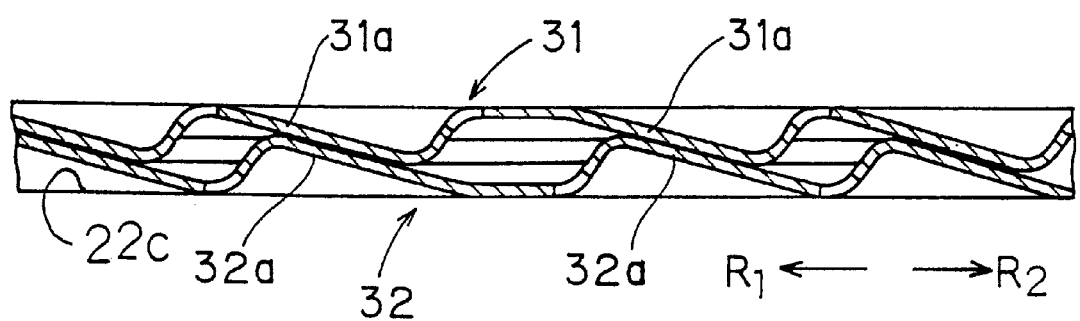
FIG. 8 is a circumferentially extending cross-sectional side view similar to FIG. 7, showing the urging mechanism of the wear compensation mechanism displaced in response to wear compensation.
Figure 9:
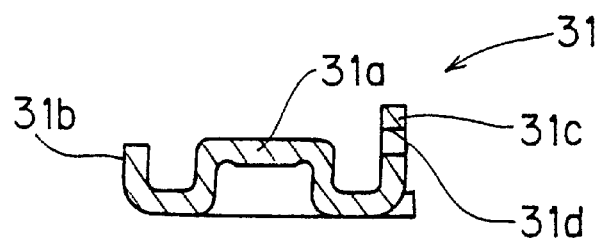
FIG. 9 is a cross-sectional side view of a portion of the urging mechanism of the wear compensation mechanism, taken along the line IX—IX in FIG. 6.

The urging mechanism 24 is disposed in the annular space between the channel 22c of the pressure plate 22 and the annular portion 23a of the fulcrum ring 23. The urging mechanism 24 biases the fulcrum ring 23 away from the pressure plate 22 in an axial direction. The urging mechanism 24 includes mainly a first support plate 31 (a first annular portion), a second support plate 32 (a second annular portion), and a plurality of return springs 33. The first and second support plates 31 and 32 are annular sheet metal members, as shown in FIGS. 6, 7 and 9. A plurality of a first and second inclined faces 31a and 32a are formed extending in a specified length in a circular direction at the first and second support plates 31 and 32. At the initial condition, the first and second support plates 31 and 32 are in a condition shown in FIG. 7, which shows that a first and second inclined faces 31a and 32a abut on each other. As shown in FIG. 7, the first inclined face 31a of the first support plate 31 is high in a R2 direction (projecting to the engine side) and low in a R1 direction. An inclination angle θ of a first and second inclined faces 31a and 32a (angle between an inclined face and the channel 22c) is preferable to be within a range of 10–15, more preferable to be within a range of 12–14. The second inclined face 32a of the second support plate 32 is formed and disposed so as to abut on the first inclined face 31a complementarily. Cylinder like members 31b and 32b are formed by bending the outer circumference of the first and second support plates 31 and 32. The cylinder like member 32b of the second support plate 32 is able to abut on an outer circumferential wall of the channel 22c of the pressure plate 22. The cylinder like member 31b of the first support plate 31 is able to abut on an inner circumferential face of the annular portion 23a of the fulcrum ring 23. The second support plate 32 is disposed in the channel 22c so as to be movable in a circular direction. The first support plate 31 is fixed to the annular portion 23a of the fulcrum ring 23 by a plurality of rivets 34 (FIG. 3). A plurality of spring connecting members 31c and 32c were formed by cutting and bending in an axial direction at the inner circumferential member of the first and second support plates 31 and 32, respectively.

Holes 31d and 32d which pass through the spring connecting members 31c and 32c in a radial direction, respectively, are formed. Both ends of the return spring 33 connect the spring connecting members 31c and 32c which locate at different position in a circular direction. Both ends of the return spring 33 are inserted in the holes 31d and 32d of the spring connecting members 31c and 32c. In an initial condition as shown in FIG. 7, the return spring 33 pulls the second support 32 in a R2 direction against the first support plate 31. A wedge mechanism includes the inclined faces 31a and 32a always urges the first support plate 31 and the fulcrum ring 23 in an axial direction.

The urging mechanism 24 is disposed at the inner circumference of the pressure plate 22 and the inner circumferential side of the urging mechanism 24 is exposed. Therefore, the operation of the urging mechanism is easy. For example, it is easy to install or remove the return spring 33.

Since the first and second support plates 31 and 32 are made of sheet metal formed by a press and a plurality of the inclined faces 31a and 31b are formed at the same time, the cost of their production is low. Since the spring connecting members 31c and 32c which connect with the return spring 33 are formed at the first and second plates 31 and 32 in a body, respectively, the whole structure is simple. Since the inclined faces 31a and 32a are formed in a body, the amount of moving in a circular direction of the second inclined face 32a is constant. As the result, the amount of projection in an axial direction of the fulcrum ring 23 is kept constant in a circular direction.

Both or either of the engine side face of the second support plate 32 and the channel 22c of the pressure plate 22 may be coated with a friction material (friction coefficient adjusting material) to increase the friction coefficient compared with the conventional one. As the result of coating, under adjustment is avoided even if there are vigorous vibrations. The under adjustment is a phenomenon that, in engaging the clutch when the force is applied in an axial direction to the fulcrum ring 23 and as the result the force is applied from the first inclined face 31a of the wedge mechanism to the second inclined face 32a, the second support plate 32 slides in a R1 direction because the force applied to the second support plate 32 in a circular direction increases by vibration. In that case, the location of the fulcrum ring 23 does not correspond to the wear amount.

One way to prevent the under adjustment mentioned above is to have a small angle between the first and second inclined faces 31a and 32a. In that case, a component in a circular direction of the force which acts in an axial direction from the first inclined face to the second inclined face is small. However, because of the following problems, it is hard to put the wedge mechanism with a small angle for a practical use. First, a phenomenon referred to as over adjustment can occur where, in disengaging the clutch, the second support plate 32 rotates too much in a R2 direction and the fulcrum ring 23 moves in an axial direction beyond the wear amount tends to happen. Secondary, the rotational angle of the second support plate 32 is larger even if the amount of wear is the same. As the result, the biasing load of the return spring 33 decreases. Although such decrease is not preferable, it is difficult to make a return spring which prevents the decrease in force.

The present invention suppresses the under adjustment without too small an inclined angle of the inclined face. The present invention also adjusts the sliding tendency of the second support plate 32 by a simple coating of friction material.

The regulating mechanism 25 prevents the fulcrum ring 23 from moving in an axial direction when the friction facing 11 does not have an wear, but detects the amount of wear and permits the fulcrum ring 23 to move in an axial direction depending on the wear amount when the friction facing 11 has an wear. Four regulating mechanisms 25 are disposed at equal intervals in a circular direction, corresponding to the tapped hole 22e of the pressure plate 22 and the second hole 23c of the fulcrum ring 23. The regulating mechanism 25 includes a bolt (a first member) 38 and a bush (a second member) 39. Thus, the regulating mechanism 25 includes two simple members.

The bolt 38 includes a main body 38a, a screw member 38b formed at the end member of the main body 38a and the head portion 38c. The screw member 38b connects with the tapped hole 22e of the pressure plate 22. By the connection, the bolt 38 is fixed to the pressure plate 22. The main body 38a of the bolt 38 passes through the second hole 23c of the fulcrum ring 23 and the first hole 21d of the clutch cover 21. There is a space around the main body 38a between the first hole 21d and the second hole 23c. The head portion 38c is disposed with a space from the facing member 21c of the clutch cover 21. The first member which is fixed to the pressure plate 22 may be not only a bolt but also other stick like element such as a pin.

Figure 4:
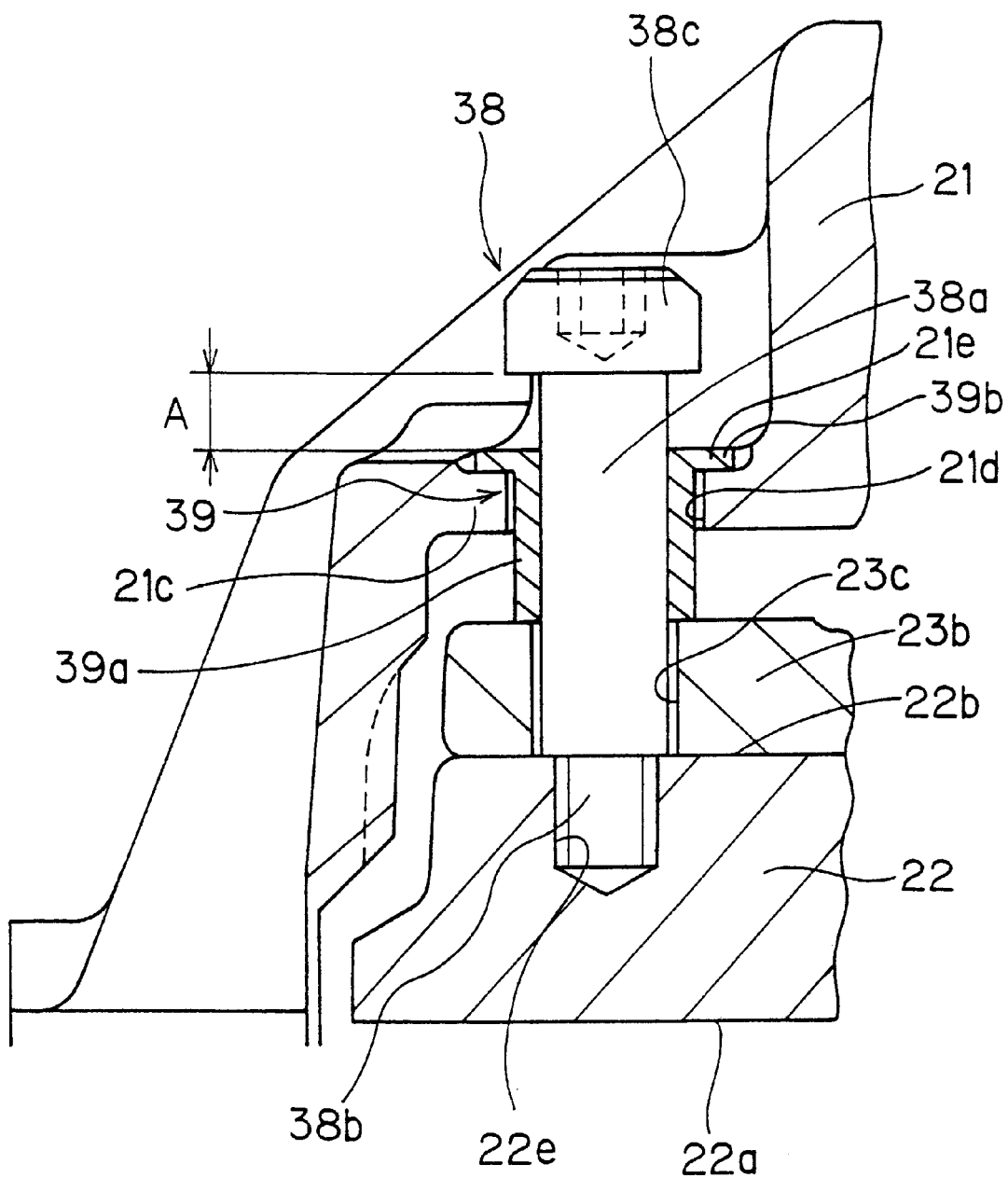
FIG. 4 is a fragmentary cross-sectional view showing a portion of FIG. 2 on an enlarge scale.
Figure 5:
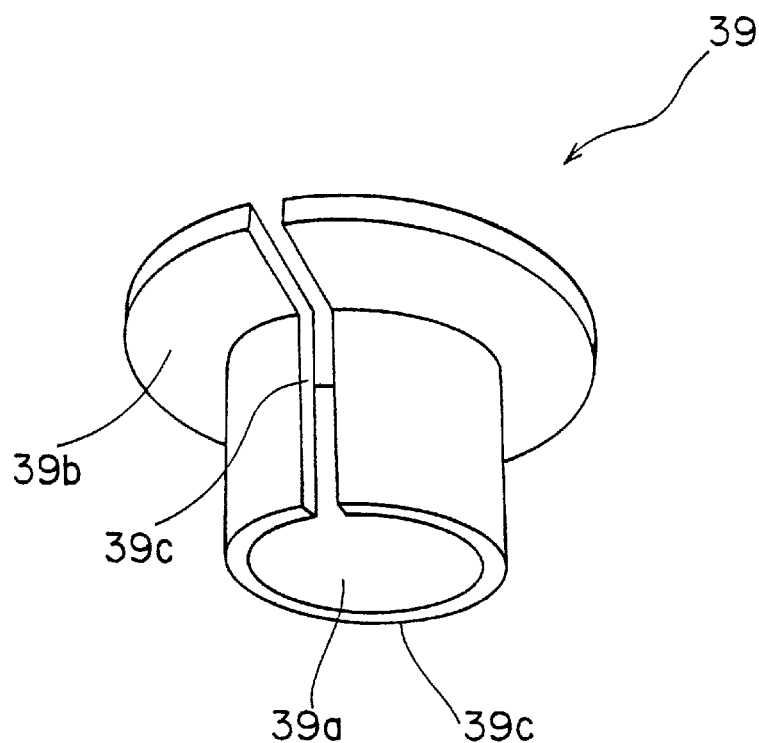
FIG. 5 is a perspective view of a bush of a regulating mechanism shown removed from the clutch device depicted in FIGS. 1, 2, 3 and 4.

The bush 39 is a tube like member as shown in FIG. 5 and can deform elastically in a radial direction. The bush 39 includes a tube portion 39a and a disk like flange 39b which extends from one end of the tube portion 39a to the outer circumferential side. A slit 39c extending in an axial direction is formed in the tube portion 39a and the flange 39b. The bush 39, as shown in FIG. 4, is installed in the first hole 21d of the facing member 21c of the clutch cover 21 and around the outer circumference of the main body 38a of the bolt 38. The bush 39 is set firmly around the outer circumference of the main body 38a. One end of the tube 39a abuts on the transmission side face of the projection portion 23b of the fulcrum ring 23. There is a space between the outer circumference of the tube 39a and the first hole 21d of the clutch cover 21. The flange 39b is placed abutting on the bottom of the hollow 21e of the facing member 21c. The space A in an axial direction between the flange 39b and the head portion 38c of the bolt 38 is as much as or more than the wear amount expected. Since the bush 39 is an elastic tube like member with a slit, it easily bends and deforms. Therefore, the friction resistance against the bolt 38 is stable.

The clutch pressing mechanism 27 presses the pressure plate 22 via the fulcrum ring 23 toward the flywheel 2. The clutch pressing mechanism 27 includes a lever member 46(pressing member), a retainer 47, a plate 48, an abutting plate 49, a snap ring 50, a diaphragm spring 51, a pin 52 and a split pin 53.

The retainer 47 is an annular portion which is installed around the outer circumference of a power input shaft (not shown in Figure) of the transmission (not shown). The retainer 47 connects with the release device 28, described below. The retainer 47 includes mainly a cylinder like main body 47a and a flange 47b which extends from the end of the transmission side of the main body 47a to the outer circumferential side. The retainer 47 connects with the pin 52, which is fixed to the inner circumference of the disk like member 21b of the clutch cover 21, so as not to rotate relatively but to be movable in an axial direction.

The diaphragm spring 51 is roughly disk like. The diaphragm spring 51 has an annular elastic member 51a at the outer circumference and a plurality of lever elements 51b extending from the elastic member to the inner circumferential side. A hole with a large diameter is formed at the center of the diaphragm spring 51 and a plurality of slits 51c are formed extending in a radial direction from the inner circumferential edge. An oval hole 51d which is wider in a circular direction than the slit 51c is formed at the outside edge of the slit 51c in a radial direction or at the bottom of the lever element 51b. The outer circumference of the diaphragm spring 51 is supported by the clutch cover 21. Its inner circumferential edge gives a specified pressure against the retainer 47, urging the retainer to the engine side. The split pin 53 fixed to the retainer 47 is inserted between the lever elements 51b of the diaphragm spring 51 at a plurality points. Therefore, the diaphragm spring 51 rotates with the retainer in a body.

The lever member 46 presses the fulcrum ring 23, increasing the pressing force transmitted from the diaphragm spring 51. The lever members 46 are disposed in a radial way at equal intervals in a circular direction. Each lever member 46 is formed, for example, by deformation of a metallic plate member. The outside portion in a radial direction of the lever member 46 is bent so as to project toward the transmission side. A hole 46b extending long in a circular direction is formed at the projection portion. A connecting projection portion 21f extending from the clutch cover 21 connects with the hole 46b. Therefore, the lever member 46 rotates with the clutch cover 21. Both sides in a circular direction of the hole 46b are fulcrums 46a which abut on the clutch cover 21 so as to be able to oscillate.

A contact point 46c which projects to the engine side and abuts on the annular portion 23a of the fulcrum ring 23 is formed at the outside member in a radial direction of the lever member 46. An engagement point 46d which projects toward the transmission side is formed at the inside member in a radial direction of the lever member 46. The engagement point 46d is placed at the engine side of the flange 47b of the retainer 47.

A cone spring 60 and the plate 48 are disposed between the flange 47b and the engagement point 46d of the lever member 46. In engaging the clutch as shown in FIGS. 2 and 3, the cone spring 60 is flat, pressed between the flange 47b and the engagement point 46d. The engagement point 46d of the lever member 46 abuts on the engine side of the disk like plate 48. The abutting plate 49 is fixed to the engine side of the outer circumference of the main body 47a of the retainer 47 by the snap ring 50. The outer circumference of the abutting plate 49 is bent projecting toward the transmission side. In engaging the clutch as shown in FIG. 2, a specified space is ensured between the bent member and the lever member 46.

The release device 28 releases the clutch by releasing the pressure from the clutch pressing mechanism 27 toward the pressure plate 22. The release device 28 includes a release bearing 54, a quill 55, a cylinder member 56, a supporting ring 57, a snap ring 58, and a coil spring 59. The release bearing 54 includes an inner race, an outer race and a plurality of rolling elements disposed between the inner and outer races.

The quill 55 is disposed around the circumference of the release bearing 54, and is fixed to the outer race so as not to rotate relatively. The cylinder member 56 is fixed to the inner race, and its end is installed in the inner circumferential side of the retainer 47. The supporting ring 57 is fixed to the cylinder member 56 by the snap ring 58 fixed to the end of the outer circumference of the cylinder member 56. The supporting ring 57 abuts on the face of the engine side of the inner circumference of the retainer 47. The abutting faces of the supporting ring 57 and the retainer 47 are spherical shapes and can absorb a miss alignment. The coil spring 59 is installed around the outer circumference of the cylinder member 56. The coil spring 59 is installed pressed between the inner race and the retainer 47.

Operation of the First Embodiment

In engaging the clutch as shown in FIGS. 2–4, the diaphragm spring 51 urges the retainer 47 toward the engine side, and the retainer urges the fulcrum ring 23 toward the engine side via the lever member 46. As the result, the friction disk 4 and the intermediate plate 5 of the clutch disk assembly 3 is held between the pressure plate 22 and the flywheel 2. Thus, engaging the clutch is done.

Figure 11:
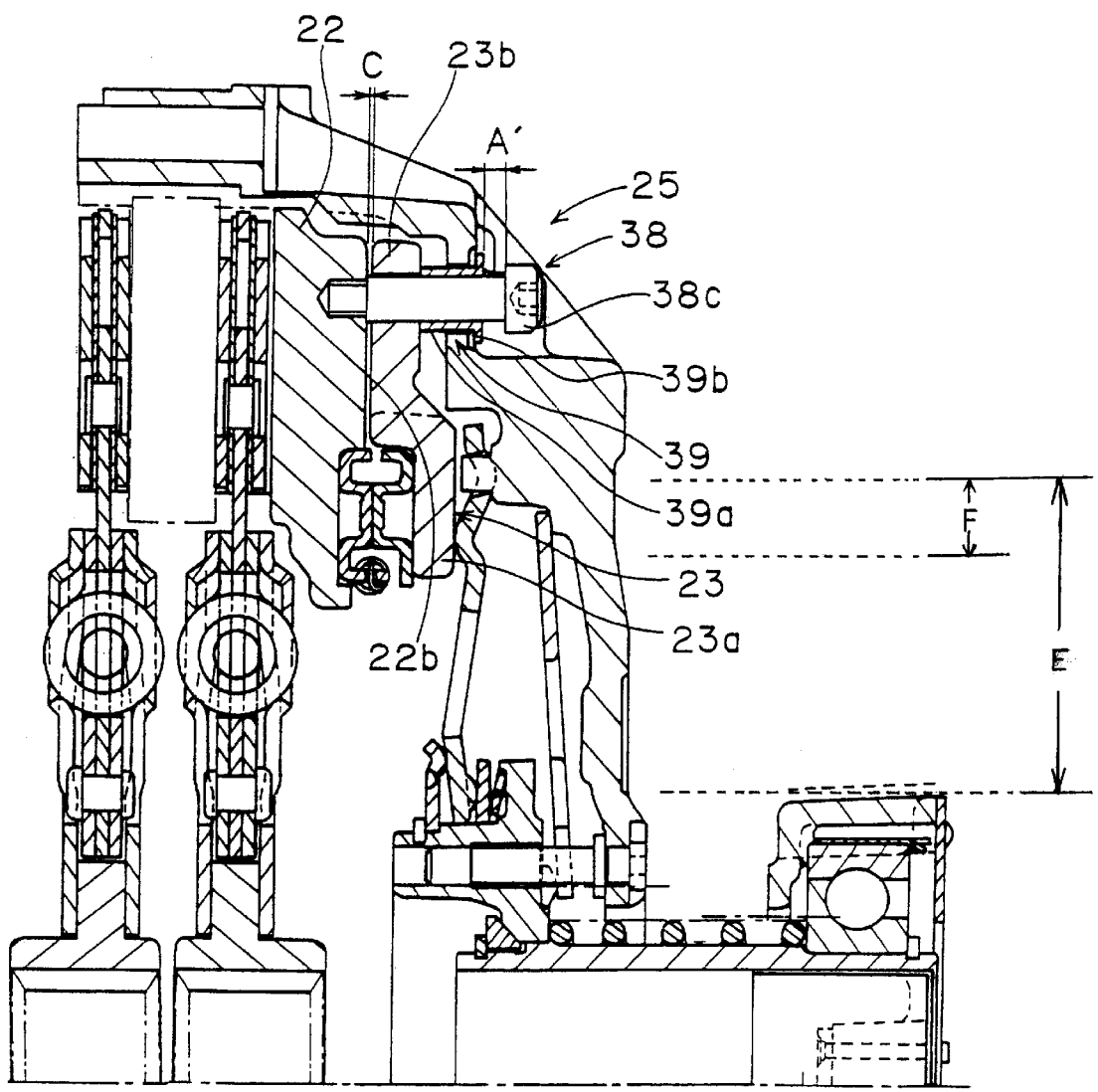
FIG. 11 is a fragmentary, cross-sectional side view of the clutch device in a second operational state.

When the distance between the engagement point 46d and the fulcrum 46a of the lever member 46 is E and the distance between the contact point 46c and the fulcrum 46a is F, the lever ratio of the lever member 46 is E/F (see FIG. 11). In other words, the pressing force from the diaphragm spring 51 is multiplied by E/F and the multiplied force is applied to the fulcrum ring 23. Therefore, the pressing force of the diaphragm spring 51 can be set to be small.

The cone spring 60 plays a role of a cushioning plate when beginning to engage the clutch.

In disengaging the clutch, since the quill 55 is moved toward the transmission side, the release bearing 54, the cylinder member 56 and the retainer 47 moves toward the transmission side. After the bending member of the abutting plate 49 abuts on the lever member 46, the lever member 46 moves toward the transmission side. As the result, the contact point 46c leaves quickly the fulcrum ring 23 because the distance between the member of the lever member 46 abutted by the abutting plate 49 and the contact point 46c is shorter than that between the engagement point 46d and the contact point 46c. Therefore, the sharp disengagement of the clutch is obtained.

Since the pressing force of the diaphragm spring 51 is set to be small, the load which the diaphragm spring 51 gives to the retainer 47 in disengaging the clutch is small. As the result, the load to release the clutch is small. In addition, since the cone spring 60 urges the retainer 47 in a moving direction (transmission side), the load to release the clutch becomes smaller. Therefore, the necessary load to press a clutch pedal greatly decreases.

When the contact point 46c of the lever member 46 leaves the fulcrum ring 23, the fulcrum ring 23 moves toward the transmission side by the biasing force of the strap plate 42. At the same time, the pressure plate 22 moves together with the fulcrum ring 23. Since the friction resistance between the bolt 38 and the bush 39 is set to be larger than the combination of the biasing force of the strap plate 42 and the urging mechanism 24, the bolt 38 does not slide inside the bush 39. In other words, the fulcrum ring 23 moves the pressure plate 22 in an axial direction via the regulating mechanism. As the result, the pressure of the pressure plate 22 toward the friction disk 4 of the clutch disk assembly 3 is released.

The friction resistance caused between the bolt 38 and the bush 39 is much larger, preferably more than two times, than the total of the repelling force of the strap plate 42 and the urging force of the urging mechanism 24. Under the above setting, when the vibration is transmitted from the flywheel 2 to the pressure plate 22, the bolt 38 does not slide inside the bush 39 and the strap plate 42 is bent. The amount of wear is made up correctly.

Wear

Figure 10:
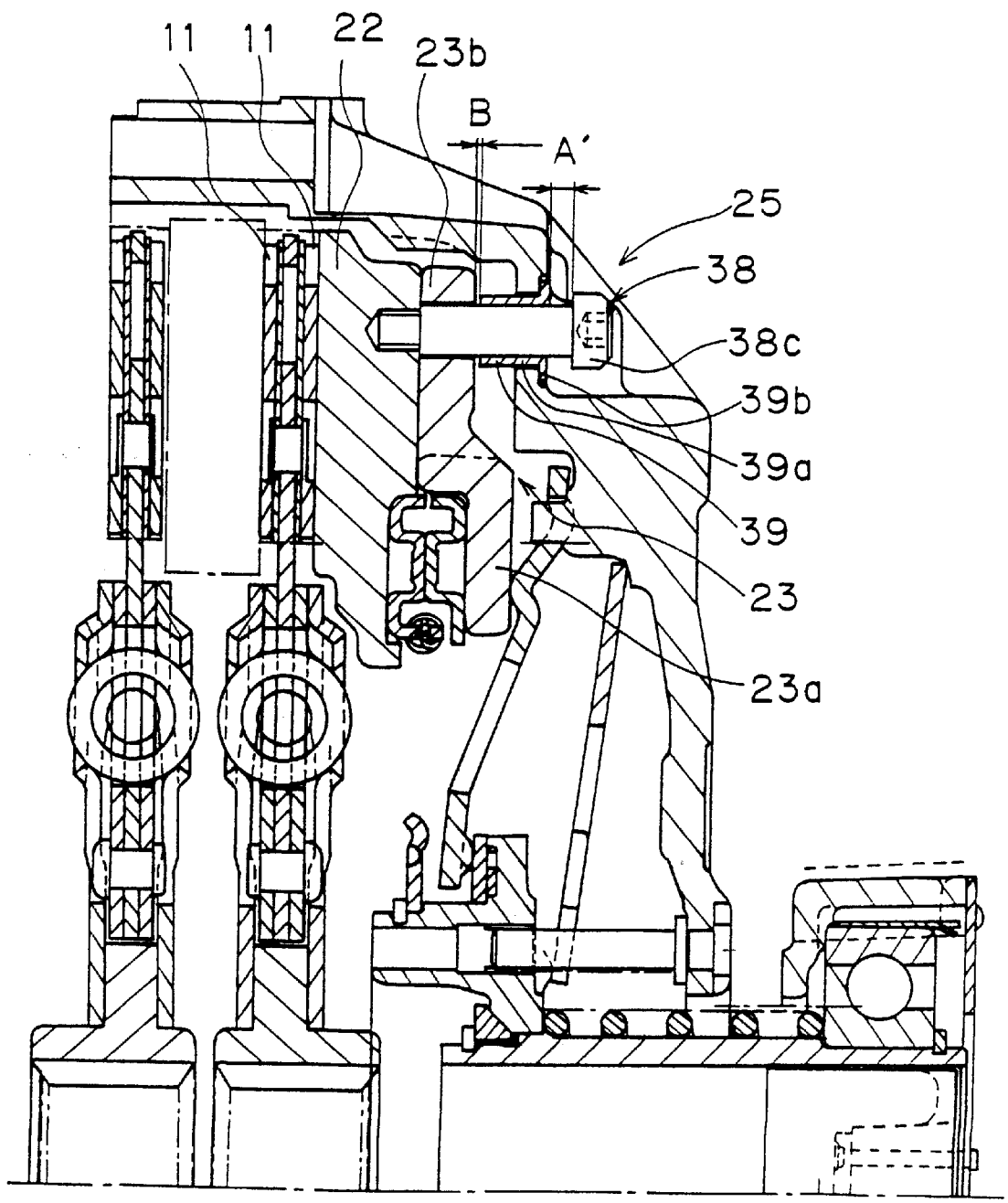
FIG. 10 is a fragmentary, cross-sectional side view of the clutch device in a first operational state.
Figure 12:
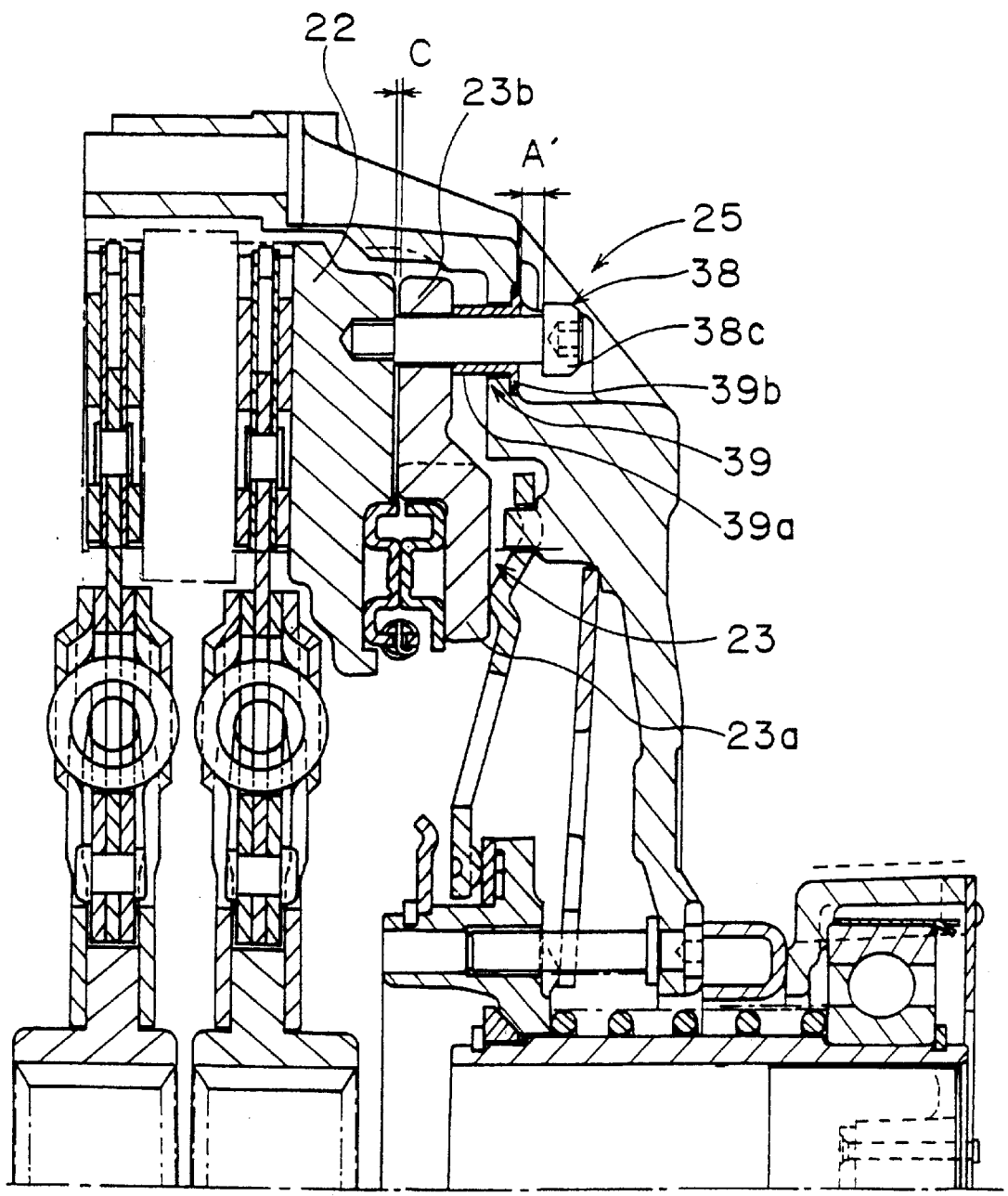
FIG. 12 is a fragmentary, cross-sectional side view of the clutch device in a third operational state.

When the friction facing 11 is worn in engaging the clutch, the pressure plate 22 and the fulcrum ring 23 moves as much as the amount of wear toward the friction facing. At that time, the bolt 38 of the regulating mechanism 25 moves toward the engine side together with the pressure plate 22. However, the bush 39 cannot move because the flange 39b abuts on the facing member 21c. Therefore, the bolt 38 moves in an axial direction against the bush 39. As the result, as shown in FIG. 10, the space B which is equal to the wear amount of the friction facing 11 is formed between the projection portion 23b of the fulcrum ring 23 and the end of the tube portion 39a of the bush 39. The space in an axial direction between the flange 39b and the head portion 38c of the bolt 38 decreases as much as the wear amount becomes A', A'=A−B (A is shown in FIG. 4, B is shown in FIG. 10 and A' is shown in FIGS. 10, 11 and 12).

In beginning to disengage the clutch, the fulcrum ring 23 moves toward the transmission side until it touches the bush 39 by the urging force of the urging mechanism 24. After the projection portion 23b touches the tube portion 39a of the bush 39, the fulcrum ring 23 does not move any more in such a direction that it leaves the pressure plate 22. As mentioned previously, this is because the friction resistance caused between the bolt 38 and the bush 39 is set to be larger than the total of the repulsion of the strap plate 42 and the urging force of the urging mechanism 24. As the result, over adjustment of the wear (which means that the fulcrum ring 23 moves away from the pressure plate 22 more than the amount of wear) hardly happens.

As the results of operations, the space C between the second side face 22b of the pressure plate 22 and the fulcrum ring 23, which is equal to the wear amount B is formed as shown in FIG. 11. In beginning to engage the clutch, the situation changes to that shown in FIG. 12. Comparing FIG. 12 with FIG. 2, the space C is formed between the pressure plate 22 and the fulcrum ring 23 ,and the space A' between the flange member 39b of the bush 39 and the head portion 38c of the bolt 38 is smaller as much as the previous wear amount B, compared with the initial space A.

Since the bolt 38 and the bush 39 to detect the wear amount are placed outward from the pressure plate 22 in the structure of the regulating mechanism 25, the friction connecting member to regulate the movement of the fulcrum ring 23 is hardly affected by the heat caused at the friction face 22a side of the pressure plate 22. As the result, the amount of the friction resistance caused between the bolt 38 and the bush 39 is generally stable.

In addition, since the bolt 38 and the bush 39 are independent of the pressure plate 22 or the clutch cover 21, it is easy to set the friction resistance of the friction connecting member. The regulating mechanism 25 is formed by installing the bush 39 in the bolt 38, before being placed in the clutch cover assembly 1. In other words, it is possible to set the friction resistance of the friction connecting member outside the clutch cover assembly 1. In addition, since the pressure plate and the flywheel do not have a friction connecting member, it is further easier to set the friction resistance of the friction connecting member. The conventional pressure plate and clutch cover have the friction connecting member. In that case, since it is necessary to adjust the load in holes formed in those members, setting is not easy.

It is easy to install or remove the regulating mechanism 25 in the clutch cover assembly 1. It is possible to install or remove each regulating mechanism 25 from the transmission side of the clutch cover 21 in the tapped hole 22e of the pressure plate 22, the second hole 23c of the fulcrum ring 23 and the first hole 21d of the clutch cover 21 all of which are put together in advance.

Since the head portion 38c is formed at the bolt 38, the space A between the head portion 38c of the bolt 38 and the flange 39b of the bush 39 gets shorter as the adjustment of the wear is carried out because of the wear of the friction facing 11.

Since the space A can be observed from the outside of the clutch cover assembly 1, the time to exchange the clutch cover assembly 1 can be determined easily.

Because the fulcrum ring 23 connects with the strap plate 42 so as to be movable in an axial direction and to rotate relatively, the posture of the strap plate 42 does not change and is kept constant even if the friction facing is worn. The constant posture of the strap plate 42 is because the position of the fulcrum ring 23 in an axial direction does not change against the flywheel 2 and the clutch cover 21. When the strap plate is fixed to the pressure plate, the posture of the strap plate changes as the pressure plate moves owing to the wear of the friction facing.

Second Embodiment

FIGS. 13, 14, 15 and 16 shows a clutch cover assembly 61 in accordance with a second embodiment of the present invention. The clutch cover assembly 61 is used for a vehicle, particularly for a small vehicle such as a passenger car. The clutch cover assembly 61 selectively transmits torque, which is transmitted from a flywheel 62, to a clutch disk assembly. The clutch cover assembly 61 is installed in the flywheel 62.

The clutch disk assembly includes mainly a friction disk 64 and a hub which connects with the friction disk 64 via a coil spring. The friction disk 64 includes friction facings fixed to both sides of the outer circumference of a disk like plate. The present embodiment uses the friction facings made of an organic friction material.

Figure 13:
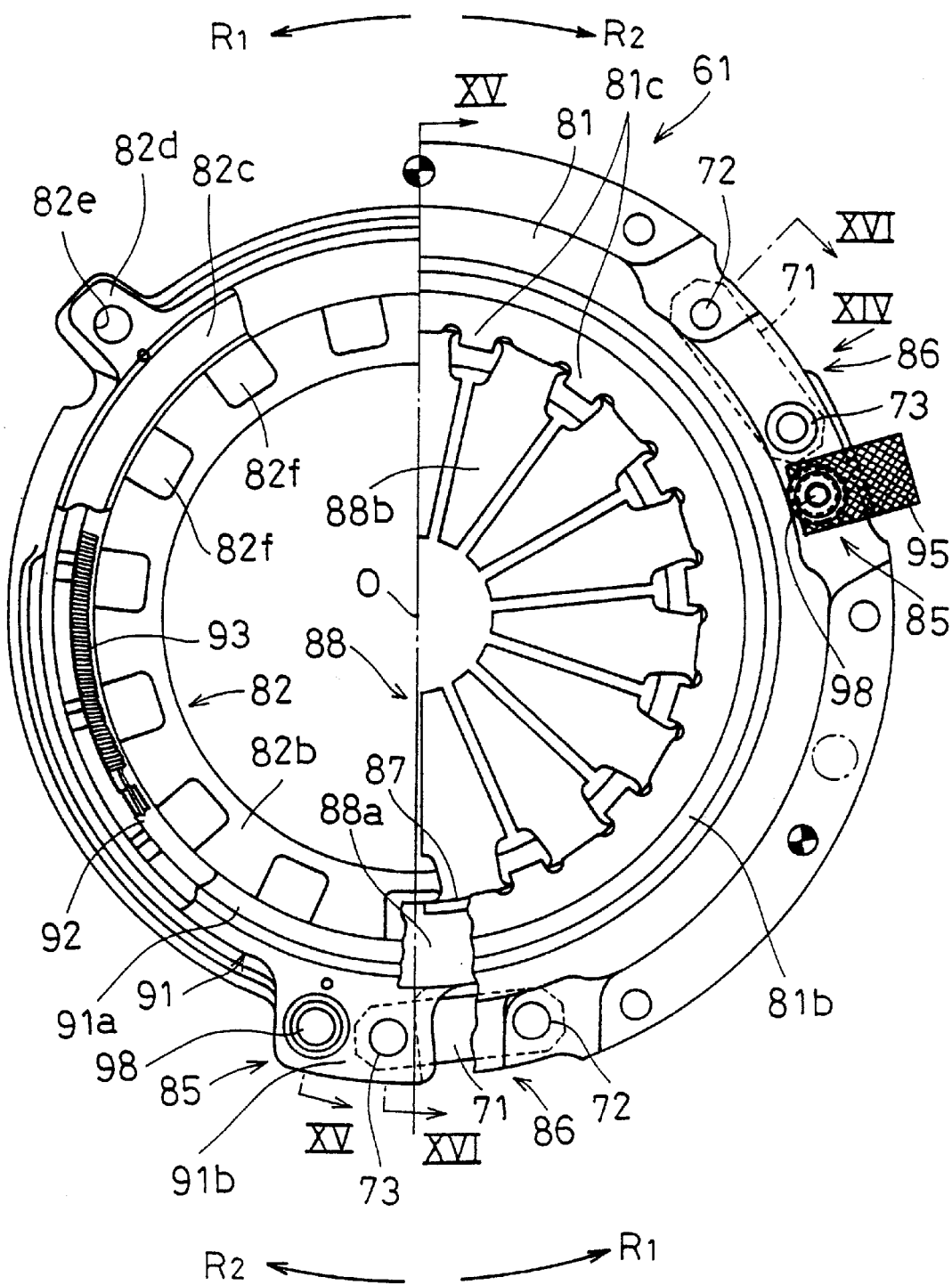
FIG. 13 is a part elevation view, part cutaway view showing a clutch cover assembly of a clutch device in accordance with a second embodiment of the present invention.
Figure 14:
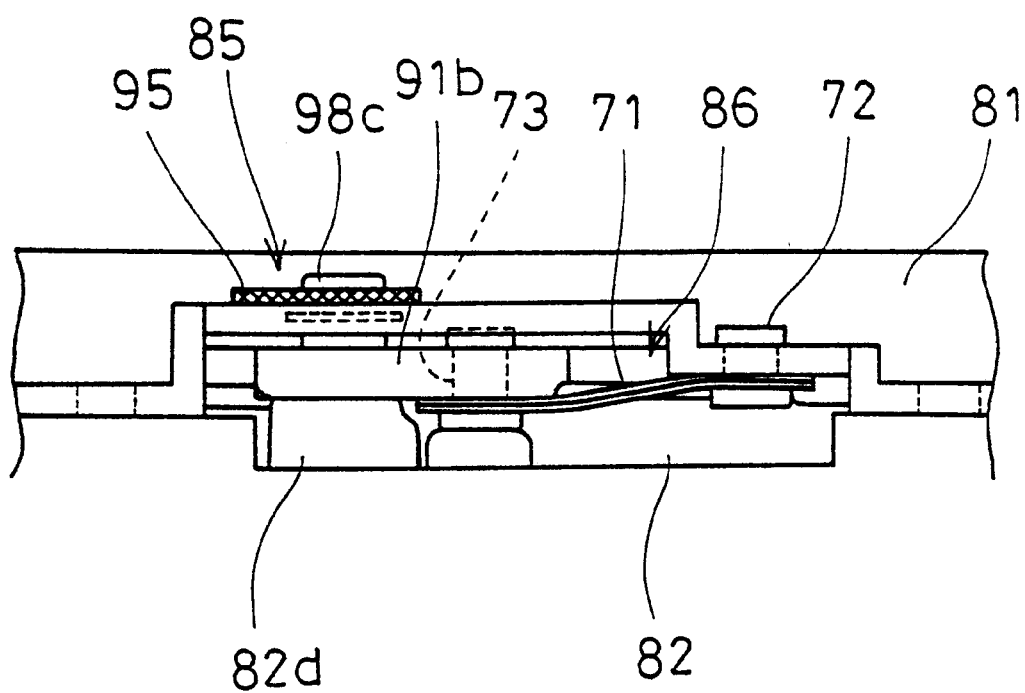
FIG. 14 is a side view of the clutch device of the second embodiment of the present invention looking in the direction of the arrow XIV in FIG. 13.
Figure 15:
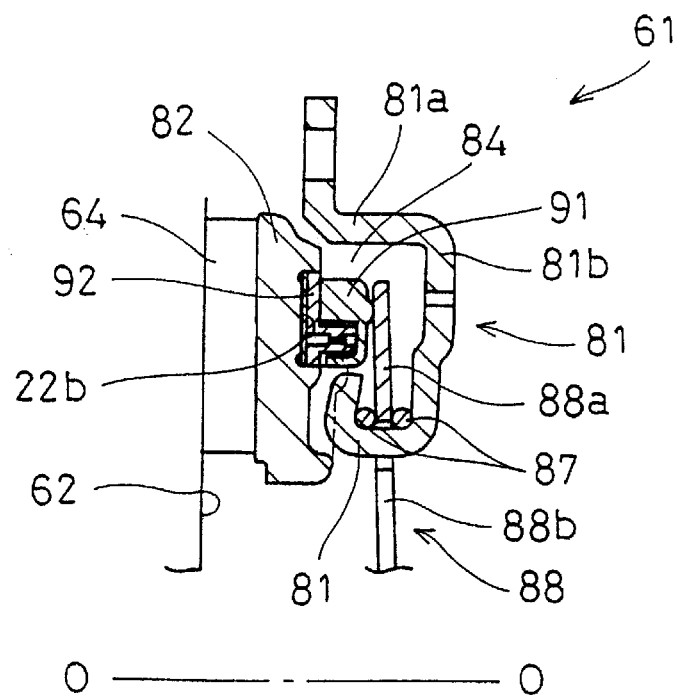
FIG. 15 is a cross-sectional side view of the clutch device taken along the line XV—XV in FIG. 13.
Figure 15:
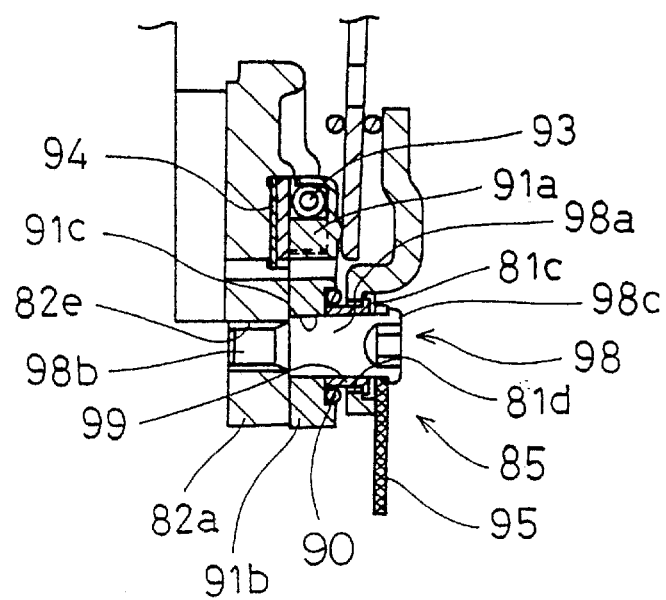
Figure 16:
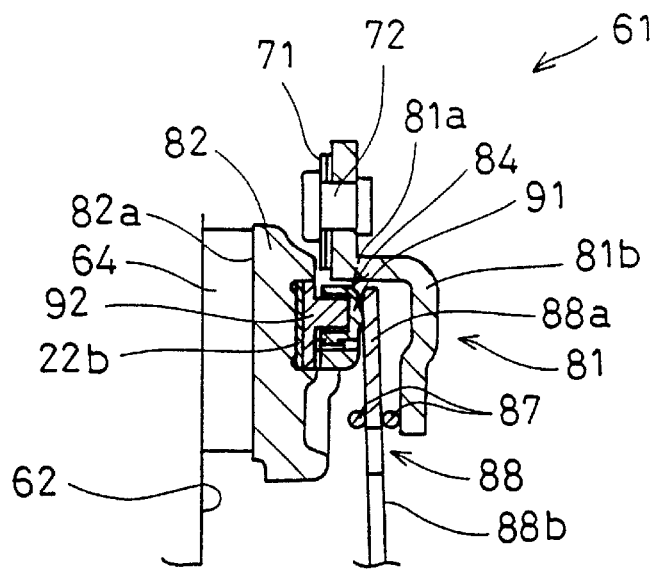
FIG. 16 is a cross-sectional side view of the clutch device taken along the line XVI—XVI in FIG. 13.
Figure 16:
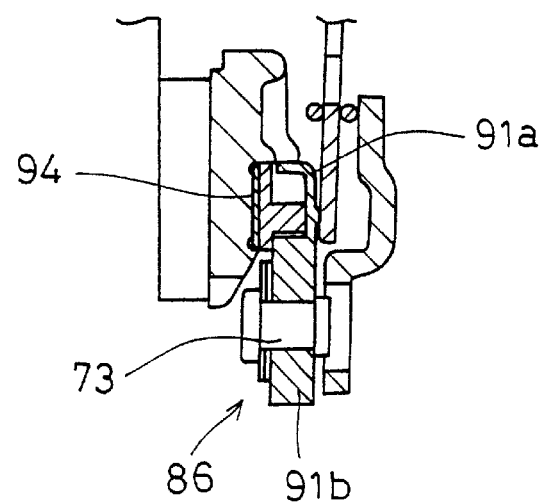

In FIG. 13, the R1 direction is a rotational direction of a clutch and the R2 direction is a rotational direction of a support plate 92, described below, which undergoes limited rotation in response to wear. In FIGS. 15 and 16, an engine (not shown) is disposed on the left side and a transmission (not shown) is disposed on the right side.

The clutch cover assembly 61 includes mainly a clutch cover 81, a pressure plate 82, a fulcrum ring 91, an urging mechanism 84, a regulating mechanism 85, a diaphragm spring (pressing member) 88 and a driving mechanism 86.

The clutch cover 81 is a dish like member installed in the flywheel 62. The clutch cover 81 includes a covering member 81*a* which covers the outer circumferential side of the clutch disk assembly, and a disk like member 81*b* which faces the transmission side of the clutch disk assembly. Three first holes 81*d* in an axial direction (FIG. 15) are formed at equal intervals in a circular direction in the disk like member 81*b*. A hollow member 81*e* which has a larger diameter than the first hole 81*d* is formed on the transmission side of the first hole 81*d*.

The pressure plate 82 is placed inside the covering member 81*a* of the clutch cover 81 and is close to the friction disk 64 between the friction disk 64 and the disk like member 81*b* of the clutch cover 81. The pressure plate 82 is an annular portion and includes a friction face 82*a* (first side face) facing the friction disk 64 and a second side face 82*b* facing the disk like member 81*b*. A channel 82*c* is formed extending in a circular direction at the second side face 82*b* of the pressure plate 82. The urging mechanism 84 described later is put in the channel 82*c*. Three connecting members 82*d* projecting in a radial direction are formed at equal intervals in a circular direction at the outer circumference of the second side face 82*b* of the pressure plate 82. A tapped hole 82*e* is formed in each connecting member 82*d*.

The fulcrum ring 91 is placed on the second side face 82*b* side of the pressure plate 82. The fulcrum ring 91 abuts on the diaphragm spring 88 and is urged together with the pressure plate 82 by the diaphragm spring 90 toward the flywheel 62 side. The fulcrum ring 91 includes an annular portion 91*a* and three projection portions 91*b* extending outward in a radial direction from the annular portion 91*a*. The annular portion 91*a* is placed facing the channel 82*c* of the pressure plate 82 with a specified distance in an axial direction. An annular convex is formed on the transmission side of the annular portion 91*a*. The projection portion 91*b* abuts on the second side face 82*b* of the pressure plate 82.

As shown in FIG. 13, the projection portion 91*b* extends in a circular direction with a specified angle, and has a second hole 91*c* in an axial direction at the R2 direction side. The second hole 91*c* corresponds to the tapped hole 82*e* of the pressure plate 82 and the first hole 81*d* of the clutch cover 81. The second hole 91*c* has a smaller diameter than the first hole 81*d*.

The fulcrum ring 91 and the pressure plate 82 rotate together with the clutch cover 81 and the flywheel 62 by the driving mechanism 86. Three driving mechanisms 86 are placed side by side in a circular direction, each comprising mainly a strap plate 71. The strap plate 71 connects the fulcrum ring 91 with the clutch cover 81 so as not to rotate but to be movable in an axial direction. The strap plate 71 is a elastic plate comprising a plurality of piled plate members extending in a circular direction (roughly tangent direction). The end member of the strap plate 71 in a R1 direction is fixed to the clutch cover 81 by the rivet 72. The end member of the strap plate 71 in a R2 direction is fixed to the R1 side of the projection portion 91*b* of the fulcrum ring 91 by the rivet 73.

The urging mechanism 84 is disposed in the annular space between the channel 82*c* of the pressure plate 82 and the annular portion 91*a* of the fulcrum ring 91. The urging mechanism 84 urges the fulcrum ring 91 away the pressure plate 82 in an axial direction (to the transmission side). The urging mechanism 84 includes mainly a member of the fulcrum ring 91, a support plate 92, a plurality of return springs 93 and a friction plate 94. A plurality of first and second inclined faces are formed extending in a circular direction with a specified length at the fulcrum ring 91 and the support plate 92, respectively. The first and second inclined faces abut on each other. The inclined angles of the first and second inclined faces (an angle between the inclined face and the channel 82*c*) are preferably between 10 and 15, more preferably between 12 and 14. In the first inclined face, the end in R2 direction is high (projecting to the engine side) and the end in R1 direction is low. The second inclined face of the support plate 92 is formed and placed so as to abut complementarily on its first inclined face. The support plate 92 is disposed so as to be movable in a circular direction within the channel 82*c*.

The first inclined faces are formed unitarily with fulcrum ring 91 and the second inclined faces are formed unitarily with the support plate 92 in a manner similar to the inclined surfaces 31*a* and 32*a* of the first embodiment, described above. The function and structure are generally the same as in the first embodiment, and will not be repeated here to avoid repetition. Further, a general description of a wear compensation mechanism is provided in U.S. Pat. No. 5,513,735, filed Feb. 24, 1995, issued May 7, 1996, to Uenohara. U.S. Pat. No. 5,513,735 is incorporated herein by reference in its entirety.

A plurality of spring connecting members are formed in each of the fulcrum ring 91 and the support plate 92. Each end of the return spring 93 connects with spring connecting members of which the locations are different in a circular direction. The return spring 93 pulls the support plate 92 in a R2 direction against the fulcrum ring 91. The wedge mechanism include the first and second inclined faces always urges the fulcrum ring in an axial direction (the first and second inclined faces being generally the same configuration as described above with respect to the first embodiment).

Figure 17:
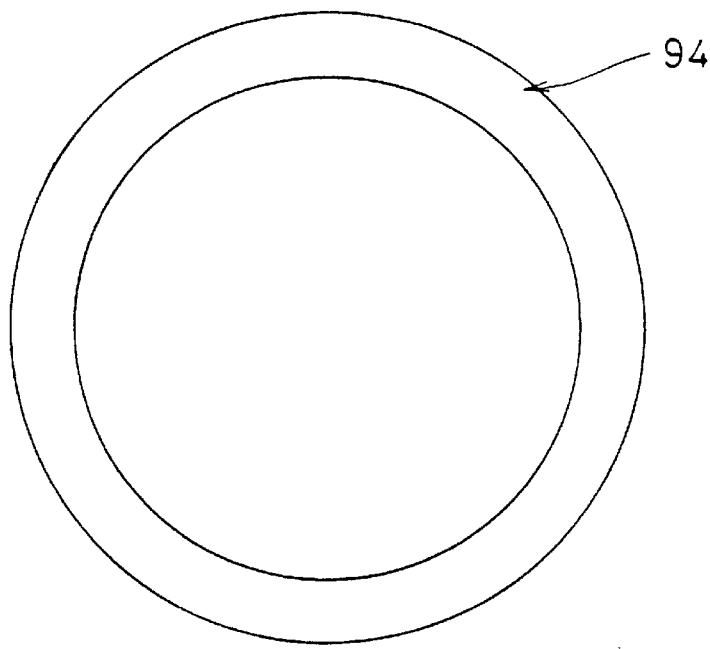
FIG. 17 is a plan view of a friction plate of the clutch device depicted in FIGS. 13, 14, 15 and 16.
Figure 18:
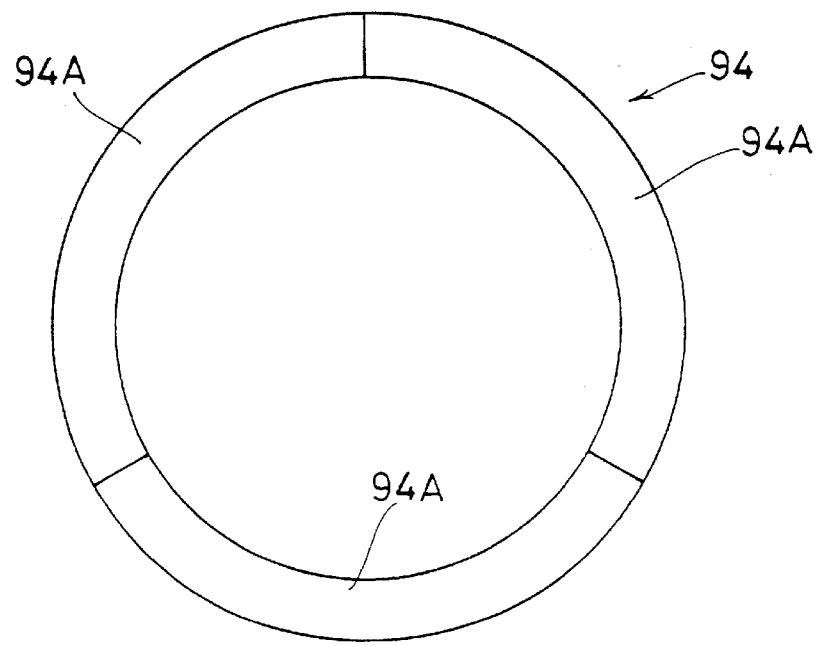
FIG. 18 is a plan view of an alternative friction plate of the clutch device depicted in FIGS. 13, 14, 15 and 16.

The friction plate 94 (a member to adjust a friction coefficient) is disposed between the support plate 92 and the channel 82. The friction plate 94 is an annular friction lining as shown in FIG. 17 and is made of a material of which the friction coefficient is higher than those of the pressure plate 82 and the support plate 92. The friction plate 94 preferably has good heat resistant properties and wear resistant properties, and to have a predetermined friction coefficient. An example of the friction plate 94 includes NAH44 (commercial name) available from Japan Balker. The friction plate 94 may be fixed to either of the channel 82c of the pressure plate 82 or the fulcrum ring 91. The friction plate 94 may be a single ring member or may be divided arc like plates 94A in order to improve yield of materials in manufacturing as shown in FIG. 18. The friction plate 94 may be bonded to either of the support plate 92 or the channel 82c of the pressure plate 82.

The friction coefficient between the pressure plate 82 and the support plate 92 is larger with the friction plate 94 compared with that in the case that the support plate 92 directly touches the channel 82c of the pressure plate 82 without the friction plate 94. As the result, under adjustment hardly happens even if a vibration is strong. Under adjustment is a phenomenon that, in engaging the clutch when the force is applied in an axial direction from the diaphragm spring 88 to the fulcrum ring 91 and as the result the force is applied from the first inclined face of the wedge mechanism to the second inclined face in an axial direction, the support plate 92 slides in a R2 direction because the force applied to the support plate 92 in a circular direction increases by vibration.

One of the way to prevent the under adjustment is to have a small angle of the first and second inclined faces. In that case, a component in a circular direction of the force which acts in an axial direction from the first inclined face to the second inclined face is small. However, because the following problems occur, it is difficult to use a wedge mechanism with inclined surface having too small an angle to practical use. First, a phenomenon called over adjustment occurs. When disengaging the clutch, the support plate 92 rotates too much in a R2 direction and the fulcrum ring 91 moves in an axial direction beyond the wear amount. Second, the rotational angle of the support plate 92 is large even if the amount of wear is the same. As the result, the biasing load of the return spring 33 decreases. Although such decrease is not preferable, it is difficult to make the return spring to prevent the decrease.

The present invention suppresses the under adjustment without an inclined angle of the inclined face. The present invention also adjusts the sliding tendency of the support plate 92 by a simple way to place the friction plate 94.

In order to satisfy the condition of the friction coefficient between the pressure plate 82 and the support plate 92, instead of using the friction plate 94, a friction material may be coated on both or either of the engine side of the support plate 92 and the channel 82c of the pressure plate 82 to increase the friction coefficient compared with the conventional one.

The regulating mechanism 85 prevents the fulcrum ring 93 from moving in an axial direction when the friction disk 64 does not have an wear, but detects the amount of wear and permits the fulcrum ring 91 to move in an axial direction depending on the wear amount when the friction disk 64 has an wear.

Three regulating mechanisms 85 are disposed at equal intervals in a circular direction, corresponding to the tapped hole 82e of the pressure plate 82 and the second hole 91c of the fulcrum ring 91. The regulating mechanism 85 includes a bolt (a first member) 98 and a bush (a second member) 99. Thus, the regulating mechanism 85 includes two simple members.

The bolt 98 includes a main body 98a, a screw member 98b formed at the end member of the main body 98a and the head portion 98c. The screw member 98b connects with the tapped hole 82e of the pressure plate 82. By the connection the bolt 98 is fixed to the pressure plate 82. The main body 98a of the bolt 98 passes through the second hole 91c of the fulcrum ring 91 and the first hole 81d of the clutch cover 81. There is a space between the main body 98a and the first hole 81d. The main body 98a abuts on the second hole 91c in a circular direction. The head portion 98c is disposed with a space from the disk like member 81b of the clutch cover 81 to the transmission side. The member which is fixed to the pressure plate 82 may be not only a bolt but also other stick like element such as a pin.

The bush 99 is a tube like member and can deform elastically in a radial direction. The bush 99 includes a tube portion 99a and a disk like flange 99b which extends from one end of the tube portion 99a to the outer circumferential side. A slit 99 extending in an axial direction is formed in the tube portion 99a and the flange 99b. The bush 99 is installed in the first hole 81d of the disk like member 81b of the clutch cover 81 and around the outer circumference of the main body 98a of the bolt 98. The bush 99 is set firmly around the outer circumference of the main body 98a. One end of the tube 99a abuts on the transmission side face of the projection portion 91b of the fulcrum ring 91. There is a space between the outer circumference of the tube 99a and the first hole 81d of the clutch cover 81. The flange 99b is placed abutting on the bottom of the hollow of the disk like member 81b. The space in an axial direction between the flange 99b and the head portion 98c of the bolt 98 is as much as or more than the wear amount of the friction disk expected. Since the bush 99 is an elastic tube like member with a slit, it easily bends and deforms. Therefore, the friction resistance against the bolt 98 is stable.

Around the engine side of the bush 99, an O ring 90 is installed as a cushioning member. The O ring 90 is put in a hollow formed at the projection portion 91b of the fulcrum ring 91. A member of the O ring 90 projects from the projection portion 91b to the transmission side. In releasing the clutch, when the fulcrum ring 91 and the pressure plate 82 approaches to the clutch cover 81 by vibration, the O ring 90 eases the shock of collision as a cushioning member.

The plate 95 is held between the clutch cover 81 and the head portion 98c of the bolt 98, and prevents the bolt 98 from sliding in the bush 99 during conveyance of the clutch cover assembly 61.

The diaphragm spring 88 is a disk like thin plate, and urges the pressure plate 82 and the fulcrum ring 91 toward the flywheel 62 side. The diaphragm spring 88 includes a annular elastic member 88a and a plurality of lever members 88b extending inward in a radial direction from the inner circumferential edge of the elastic member 88a. Both sides of the inner circumference of the elastic member 88a is supported in an axial direction by two wire rings 87 supported by a plurality of bent tabs 81c which is formed at the inner circumferential side of the clutch cover 81. Thus, the diaphragm spring 88 can oscillate with a fulcrum of two wire rings 87. The outer circumference of the elastic member 88a abuts on the convex of the fulcrum ring 91. The end of the lever member 88b connects with the release device (not shown).

Operation

In engaging the clutch, the diaphragm spring 88 urges the fulcrum ring 91 toward the engine side. As the result, the friction disk 64 of the clutch disk assembly is held between the pressure plate 82 and the flywheel 62. Thus, the clutch is engaged.

In beginning to release the clutch, the release device (not shown) moves toward the engine side, and the end of the lever member 88b of the diaphragm spring 88 is pushed toward the engine side. Then, the outer circumferential end of the elastic member 88a moves toward the transmission side, and the urging force to the fulcrum ring 91 is released. As the result, the pressing force of the pressure plate 82 to the friction disk 64 of the clutch disk assembly is released.

The friction resistance caused between the bolt 98 and the bush 99 is much larger, preferably more than two times, than the total of the repelling force of the strap plate 71 and the urging force of the urging mechanism 84. Under the above setting, when the vibration is transmitted from the flywheel 62 to the pressure plate 82, the bolt 98 does not slide inside the bush 99 and the strap plate 71 is bent. The amount of wear is made up correctly.

When the friction disk 64 is worn in engaging the clutch, the pressure plate 82 and the fulcrum ring 91 moves as much as the amount of wear toward the friction disk 64 side. At that time, the bolt 98 of the regulating mechanism 85 moves toward the engine side together with the pressure plate 82. However, the bush 99 can not move because the flange 99b abuts on the disk like member 81a. Therefore, the bolt 98 moves in an axial direction against the bush 99. As the result, the space which is equal to the wear amount of the friction disk 64 is formed between the projection portion 91b of the fulcrum ring 91 and the end of the tube portion 99a of the bush 99. The space in an axial direction between the flange 99b of the flange 99 and the head portion 98c of the bolt 98 decreases as much as the wear amount.

When beginning to disengage the clutch, the fulcrum ring 91 moves toward the transmission side until it touches the bush 99 by the urging force of the urging mechanism 84. After the projection portion 91b touches the tube portion 99a of the bush 99, the fulcrum ring 91 does not move any more in such a direction that it leaves the pressure plate 82. As mentioned previously, this is because the friction resistance caused between the bolt 98 and the bush 99 is set to be larger than the total of the repulsion of the strap plate 71 and the urging force of the urging mechanism 84. As the result, over adjustment of the wear (which means that the fulcrum ring 91 leaves the pressure plate 82 more than the wear amount) hardly happens.

As the results of operations, the space between the second side face 82b of the pressure plate 82 and the fulcrum ring 91, which is equal to the wear amount mentioned above is formed. When beginning to engage the clutch, the space is formed between the pressure plate 82 and the fulcrum ring 91, and the space between the flange member 99b of the bush 99 and the head portion 98c of the bolt 98 is smaller as much as the previous wear amount, compared with the initial space.

Since the bolt 98 and the bush 99 to detect the wear amount are placed on the side of the second side face 82b of the pressure plate 82 in the structure of the regulating mechanism 85, the friction connecting member to regulate the movement of the fulcrum ring 91 is hardly affected by the heat caused at the friction face 82a side of the pressure plate 82. As the result, the amount of the friction resistance caused between the bolt 98 and the bush 99 is stable for a long term.

In addition, since the bolt 98 and the bush 99 are independent of the pressure plate 82 or the clutch cover 81, it is easy to set the friction resistance of the friction connecting member. The regulating mechanism 85 is formed by installing the bush 99 in the bolt 98, before being placed in the clutch cover assembly 61. In other words, it is possible to set the friction resistance of the friction connecting member outside the clutch cover assembly 61. In addition, the pressure plate and the flywheel do not have a friction connecting member, it is further easier to set the friction resistance of the friction connecting member. The conventional pressure plate and clutch cover have the friction connecting member. In that case, since it is necessary to adjust the load in holes formed in those members, setting is not easy.

It is easy to install or remove the regulating mechanism 85 in the clutch cover assembly 61. It is possible to install or remove each regulating mechanism 85 from the transmission side of the clutch cover 81 in the tapped hole 82e of the pressure plate 82, the second hole 91c of the fulcrum ring 91 and the first hole 81d of the clutch cover 81 all of which are put together in advance.

Since the head portion 98c is formed at the bolt 98, the space between the head portion 98c of the bolt 98 and the flange 99b of the bush 99 gets shorter as the adjustment of the wear is carried out because of the wear of the friction disk 64.

Since the space can be watched from the outside of the clutch cover assembly 61, the timing to exchange the clutch cover assembly 61 can be determined easily.

Because the fulcrum ring 91 connects with the strap plate 71 so as to be movable in an axial direction and to rotate relatively, the posture of the strap plate 71 does not change and is kept constant even if the friction disk 64 is worn. The constant posture of the strap plate 71 is because the position of the fulcrum ring 91 in an axial direction does not change against the flywheel 62 and the clutch cover 81. When the strap plate 71 is fixed to the pressure plate 82, the posture of the strap plate 71 changes as the pressure plate 82 moves owing to the wear of the friction facing.

Since a clutch cover assembly related to the present invention has a friction coefficient adjusting part between a pressure plate and a wedge part, the desired friction coefficient can be obtained easily.

Third Embodiment

Figure 19:
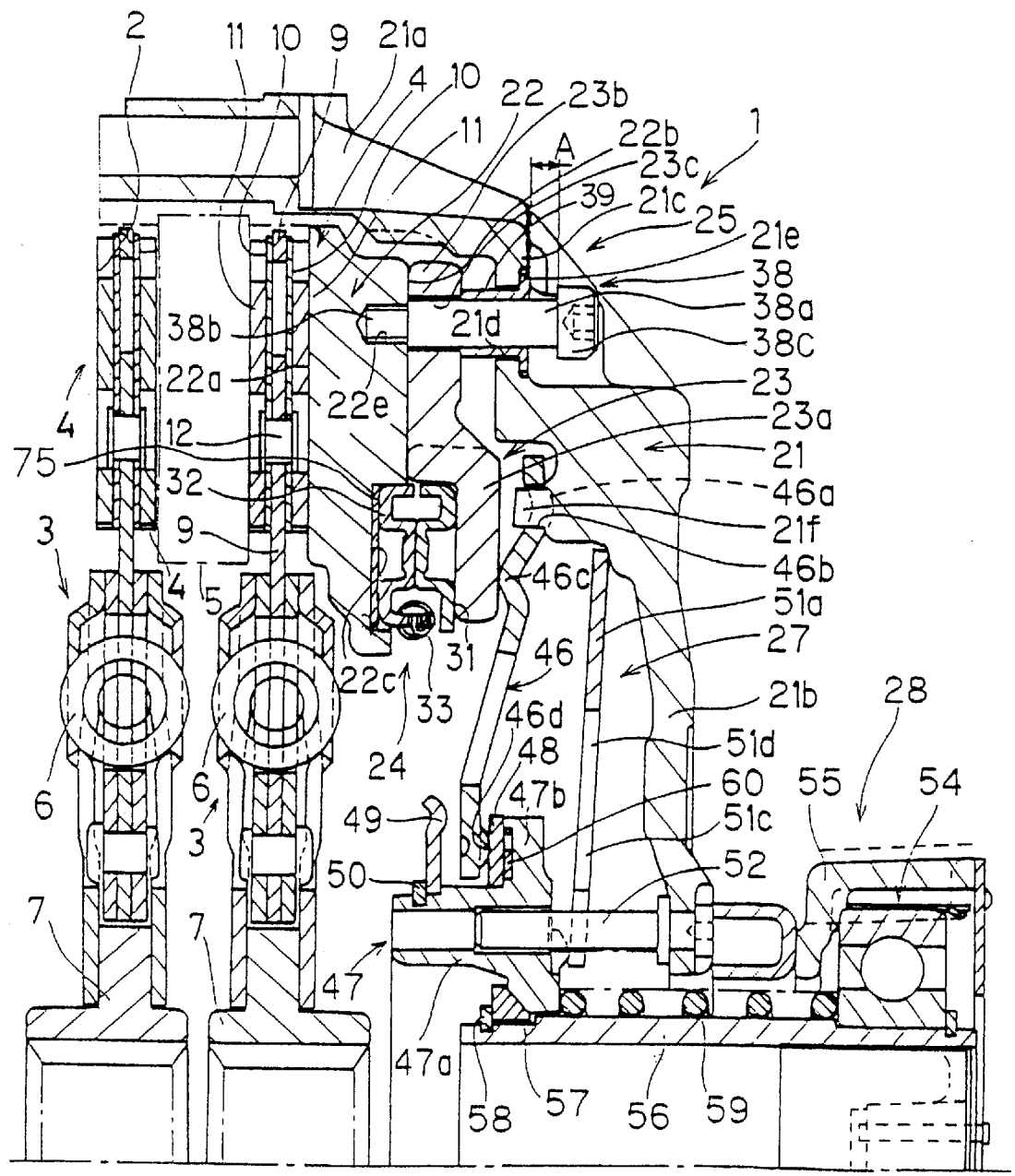
FIG. 19 shows a fragmentary cross-sectional view of a clutch cover assembly in accordance with a third embodiment of the present invention.

As shown in FIG. 19, a friction plate 75 may be disposed between the channel 22c and the second support ring 32. As the result, a configuration similar to the first embodiment may be provided with the same effect as that in the second embodiment described above.

In a clutch cover assembly relating to the present invention, the first and second members of the regulating mechanism are hardly affected by heat caused at the first side face of the pressure plate because these members are placed outside the pressure plate. As the result, the friction resistance caused between the first and second members is stable for a long term.

Various details of the invention may be changed without departing from its spirit nor its scope.

Furthermore, the foregoing description of the embodiments according to the present invention is provided for the purpose of illustration only, and not for the purpose of limiting the invention as defined by the appended claims and their equivalents.

What is claimed is:

1. A clutch cover assembly, comprising:

a clutch cover fixed to a flywheel, said clutch cover having an annular pressure plate configured for selective engagement with friction facings disposed between said pressure plate and said flywheel, said pressure plate being formed with a first side face configured for engagement with said friction facings and a second side face, a fulcrum ring disposed between said clutch cover and said second side face, a biasing element supported by said clutch cover between said clutch cover and said pressure plate, said biasing element engaging and urging said fulcrum ring toward said pressure plate, an urging mechanism disposed between said pressure plate and said fulcrum ring, said urging mechanism biasing said fulcrum ring away from said pressure plate, a regulating mechanism disposed on said clutch cover, said regulating mechanism including a first member fixed to said second side face, said first member having a portion extending in an axial direction, said regulating mechanism including a second member connected to said first member by friction force, said second member further including an abutting portion abutting on said clutch cover from a side thereof opposite said friction facings, said regulating mechanism for restricting movement of said fulcrum ring, said first member extending through said second member, wherein said regulating mechanism is configured such that in response to wear of said friction facings said regulating mechanism regulates movement of said fulcrum ring in an axial direction corresponding to wear amounts of said friction facings, and said second member moves in an axial direction against said first member in response to a predetermined force, said first member is pin-like and said second member includes an elastic tube formed with an axially extending slit, said second member being disposed firmly around an outer circumference of said first member, and one end of said second member abuts on a side of said fulcrum ring adjacent to said clutch cover.

2. A clutch cover assembly as set forth in claim 1, wherein said clutch cover is formed with a first hole in an axial direction, said fulcrum ring has a hole formed therein corresponding to said first hole, said first member extends through said first hole into said hole in said fulcrum ring, said first member further extending into said second side face of said pressure plate so as to be detachable therefrom, and said second member is set firmly around an outer circumference of said first member in said first hole and has said abutting portion an end thereof which abuts on an outer portion of said clutch cover.

3. A clutch cover assembly as set forth in claim 2, wherein said first member has a head portion at a distal end thereof having a larger diameter than that of a portion thereof which extends through said first hole, and said head portion is spaced apart from said abutting portion by a predetermined distance.

4. A clutch cover assembly as set forth in claim 3, wherein said fulcrum ring has a projecting portion projecting outward in a radial direction from an annular portion thereof, and said hole in said fulcrum ring is formed in said projecting portion.

5. A clutch cover assembly as set forth in claim 2, wherein a connecting member extends between said fulcrum ring and said clutch cover and is flexible in an axial direction, and said first member is connected with said hole in said fulcrum ring so as to be movable in an axial direction but not to move in a circular direction with respect to said fulcrum ring.

6. A clutch cover assembly as set forth in claim 1, further comprising an elastic plate having a first end fixed to said clutch cover and a second end fixed to said fulcrum ring such that said clutch cover and said fulcrum ring are circumferentially fixed to one another but may undergo limited axial displacement with respect to one another.

7. A clutch cover assembly as set forth in claim 1, wherein said urging mechanism comprises a pair of annular members which are disposed between said pressure plate and said annular portion of said fulcrum ring, each of said annular members being formed with a plurality of inclined faces extending in a circumferential direction abutting each other, and a spring member which urges said fulcrum ring away from said pressure plate in an axial direction by urging said inclined faces against one another in the circumferential direction.

8. A clutch cover assembly as set forth in claim 1, wherein said urging mechanism comprises a first annular member which is fixed to the face of said pressure plate side of said fulcrum ring and has a plurality of first inclined faces, a second annular member which is disposed on said second side face of said pressure plate so as to be rotatable with respect thereto, said second annular member having a plurality of second inclined faces abutting on said plurality of first inclined faces, and an urging member which urges said first annular member and said fulcrum ring to move in an axial direction away from said pressure plate by urging said second annular member into rotation with respect to said first annular member and thereby urging said second inclined faces against said first inclined faces.

9. A clutch cover assembly, comprising:

a clutch cover fixed to a flywheel, said clutch cover having an annular pressure plate configured for selective engagement with friction facings disposed between said pressure plate and said flywheel, said pressure plate being formed with a first side face configured for engagement with said friction facings and a second side face, a fulcrum ring disposed between said clutch cover and said second side face, said fulcrum ring being formed with a plurality of first inclined faces on an annular portion thereof extending toward the flywheel, a biasing element supported by said clutch cover between said clutch cover and said pressure plate, said biasing element biasing said fulcrum ring toward said pressure plate and thereby biasing said pressure plate toward the flywheel, an urging mechanism disposed between said pressure plate and said fulcrum ring, said urging mechanism biasing said fulcrum ring away from said pressure plate, said urging mechanism including a wedge part formed with a plurality of second inclined faces, said fulcrum ring and said wedge part being biased into relative rotation with respect to each other such that upon relative rotation with respect to one another said first and second inclined faces engage with one another urging said fulcrum ring away from said pressure plate, said urging mechanism further including a friction coefficient adjusting part disposed between said wedge part and said pressure plate, a regulating mechanism disposed on said clutch cover configured such that in response to wear of said friction facings said regulating mechanism regulates movement of said fulcrum ring in an axial direction corresponding to wear amounts of said friction facing, and circumferentially fixes said fulcrum ring to said clutch cover, and wherein said friction coefficient adjusting part has a higher friction coefficient than said pressure plate and said wedge part.

10. A clutch cover assembly as set forth in claim 9, wherein said friction coefficient adjusting part is an annular plate.

11. A clutch cover assembly as set forth in claim 9, wherein said friction coefficient adjusting part covers at least a portion of one of said pressure plate and said wedge part.

12. A clutch cover assembly as set forth in claim 9, wherein an inclining angle of said first inclined face and said second inclined face is set to be between approximately 7 to 13 degrees.

13. A clutch cover assembly comprising:
- a clutch cover fixed to a flywheel, said clutch cover having an annular pressure plate configured for selective engagement with friction facings disposed between said pressure plate and said flywheel, said pressure plate being formed with a first side face configured for engagement with said friction facings and a second side face,
- a fulcrum ring disposed between said clutch cover and said second side face, said fulcrum ring being formed with a plurality of first inclined faces on an annular portion thereof extending toward the flywheel,
- a biasing element supported by said clutch cover between said clutch cover and said pressure plate, said biasing element biasing said fulcrum ring toward said pressure plate and thereby biasing said pressure plate toward the flywheel,
- an urging mechanism disposed between said pressure plate and said fulcrum ring, said urging mechanism biasing said fulcrum ring away from said pressure plate, said urging mechanism including a wedge part formed with a plurality of second inclined faces, said fulcrum ring and said wedge part being biased into relative rotation with respect to each other such that upon relative rotation with respect to one another said first and second inclined faces engage with one another urging said fulcrum ring away from said pressure plate, said urging mechanism further including a friction coefficient adjusting part disposed between said wedge part and said pressure plate,
- a regulating mechanism disposed on said clutch cover configured such that in response to wear of said friction facings said regulating mechanism regulates movement of said fulcrum ring in an axial direction corresponding to wear amounts of said friction facing, and circumferentially fixes said fulcrum ring to said clutch cover, and
- wherein said friction coefficient adjusting part is a high friction coefficient coating coated on one of said wedge part and said pressure plate.

* * * * *